(12) United States Patent  
Lazear et al.

(10) Patent No.: US 7,970,683 B2  
(45) Date of Patent: Jun. 28, 2011

(54) SYSTEM AND METHOD FOR MULTI-STATE TAX ANALYSIS

(75) Inventors: Edward P. Lazear, Portola Valley, CA (US); Alexandre Ziegler, Collonge-Bellerive (CH)

(73) Assignee: Thomson Reuters (Tax & Accounting) Inc., Carrollton, TX (US)

( * ) Notice: Subject to any disclaimer, the term of this patent is extended or adjusted under 35 U.S.C. 154(b) by 594 days.

(21) Appl. No.: 11/551,690

(22) Filed: Oct. 20, 2006

(65) Prior Publication Data

US 2007/0198390 A1 Aug. 23, 2007

Related U.S. Application Data

(63) Continuation-in-part of application No. 10/319,182, filed on Dec. 13, 2002.

(60) Provisional application No. 60/729,367, filed on Oct. 20, 2005, provisional application No. 60/341,129, filed on Dec. 13, 2001.

(51) Int. Cl.  
*G06Q 40/00* (2006.01)

(52) U.S. Cl. ........................................ 705/36 T; 705/35

(58) Field of Classification Search ................ 705/36, 705/36 T  
See application file for complete search history.

(56) References Cited

U.S. PATENT DOCUMENTS

| 2002/0178039 | A1* | 11/2002 | Kennedy | 705/7 |
| 2003/0093320 | A1* | 5/2003 | Sullivan | 705/19 |
| 2003/0195780 | A1* | 10/2003 | Arora et al. | 705/7 |

* cited by examiner

*Primary Examiner* — Jagdish N Patel  
*Assistant Examiner* — Kevin Poe  
(74) *Attorney, Agent, or Firm* — Valenti Hanley & Robinson, PLLC; Kevin T. Duncan

(57) ABSTRACT

In an embodiment one or more alternate entity structures are created in response to a base entity structure. A tax liability is determined for each alternate entity structure and the base entity structure; furthermore, a result is generated in response to comparing each of the determined tax liabilities with one another.

36 Claims, 23 Drawing Sheets

US 7,970,683 B2

SYSTEM AND METHOD FOR MULTI-STATE TAX ANALYSIS

CLAIM OF PRIORITY

The present patent application claims the priority benefit of the filing date of U.S. provisional application No. 60/729,367 filed Oct. 20, 2005, the entire content of which is incorporated herein by reference. The present patent application claims the benefit of priority as a continuation-in-part of U.S. patent application Ser. No. 10/319,182 filed Dec. 13, 2002, entitled Computer-Based Optimization System for Financial Performance Management, which claims benefit of priority to U.S. provisional application No. 60/341,129, filed Dec. 13, 2001, entitled Computer-Based Optimization System for Financials Management.

TECHNICAL FIELD

This application relates to multi-state tax analysis and optimization.

BACKGROUND

Tax and accounting rules and regulations have become increasingly complex, especially when dealing with the complex entity structures that are typical of large corporations. For example, a corporation's entity structure may include multiple divisions, subsidiary companies, branch offices, and partnerships. Current tax rules and regulations provide some flexibility as to how to set up a corporation's legal entity structure, allowing, for example, entities to be combined (merged), split (by carving out a division and putting it in a separate legal entity), or shuffled (by moving divisions across existing entities). In a corporation consisting of several entities and/or divisions, there will be a large number of alternative ways to set up the entity structure. Traditionally, the tax consequences of these alternatives have been analyzed manually. Consequently, the corporations either do not analyze all alternatives and forfeit potential tax savings, or manually analyze the alternatives at great expense.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of one or more embodiments of the present invention. It will be evident, however, to one skilled in the art that the present invention may be practiced without these specific details.

As defined herein an "entity" includes a business unit (e.g., a corporation, a branch, a partnership, etc.). An "organization" denotes the parent company and all its subsidiaries. A "block" or "sub-entity" denotes a division, cost or revenue center, etc., that is included in an entity. An "entity structure" denotes the way that blocks are organized in entities (e.g., the assignment of blocks to entities). A "base entity structure" may include the current entity structure which is to be processed (e.g., optimized for taxation purposes), using the MSTA (multi-state tax analyzer) system. An "optimizer" or "optimizing process" may be an embodiment of the MSTA system that seeks to achieve a tax liability objective, for example, the creation of an alternative entity structure with lower total tax liability than the base entity structure. As used herein, the word "tax" shall denote the total tax liability to be minimized.

Figure 1:
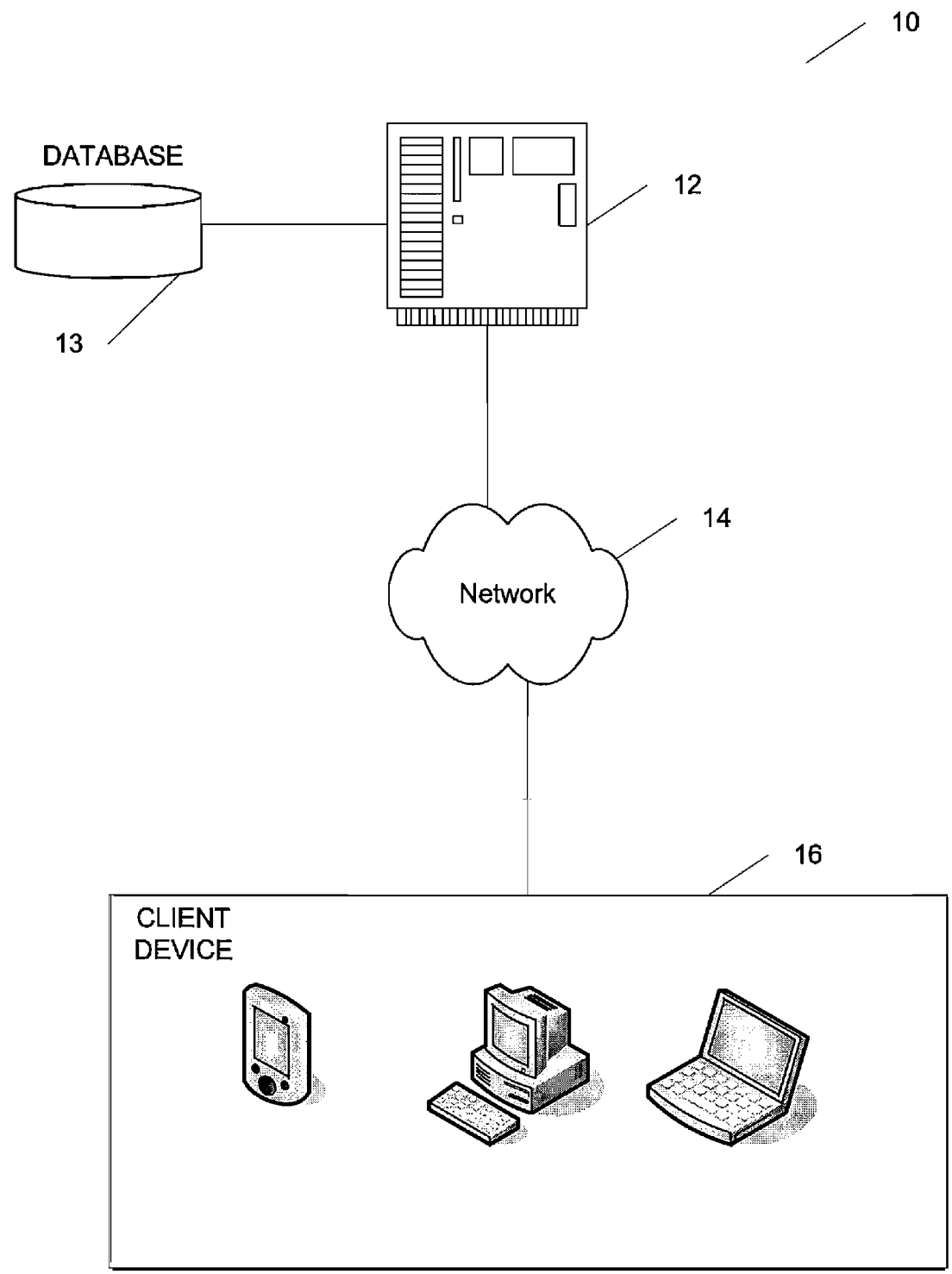
FIG. 1 is a diagram illustrating an example embodiment of a Multi-State Tax Analyzer (MSTA) system.

FIG. 1 is a diagram illustrating an example embodiment of a Multi-State Tax Analyzer (MSTA) system 10 that may be used to model changes to a legal entity structure and provide a user with a list of possible legal entity structures along with their corresponding tax liabilities. The MSTA system 10 includes a MSTA 12, a database 13, a network 14, and a client device 16. In one embodiment, the client device 16 may access, receive, communicate, and store data on the MSTA 12 through the network 14. Additionally, the client device 16 may remotely invoke MSTA functionality (e.g., multi-state tax analysis) on the MSTA 12 to process data communicated from the client device 16 or data associated with the client device 16 that may be stored in the database 13. In another embodiment, MSTA functionality and/or data storage, all or in part, may be realized by executing processes locally on the client device 16. The client device 16 may include any device (e.g., personal computer, laptop, personal digital assistant, etc.) that may process a set of instructions to execute the method and operations described herein.

In various embodiments, the MSTA system 10 may be used, inter alia, 1) to determine the optimal legal entity structure for the corporation in the event of an acquisition from a tax perspective; 2) to see whether there are ways to streamline the existing entity structure without adverse tax consequences; and 3) to determine the tax consequences based on changing the legal entity structure. For example by combining or splitting legal entities, or reshuffling entities to determine the overall entity structure incurring the lowest tax liability.

According to one embodiment, three MSTA functions may be used to model changes to the legal entity structure. The operations and results described herein may be executed and stored by the MSTA 12 and the database 13, or may be created and stored by the client device 16, or any combination thereof.

In the first operation, the MSTA system 10 may load the data that will serve as the basis for the analysis in the MSTA system 10. Let a scenario denote, inter alia, the set of data describing tax-relevant attributes of an organization. For example, tax-relevant attributes may include, but are not limited to, income and expenses, sales, property, payroll, tax credit generation, prior year NOL (net operating loss) and credit balances, legal entity structure, group membership, and applicable tax rules.

In one embodiment, a scenario may be created or modified in at least three ways: (1) by loading data from an application (e.g., a spreadsheet program such as Microsoft's Excel®); (2) by entering data through a user interface (UI); and (3) by duplicating an existing scenario already stored in the MSTA 12 (e.g., in the database 13).

In one embodiment, a duplicate scenario may be created when a change is modelled. A user may want to preserve and save a "base" scenario from which to repeat the process of modelling changes to the base entity structure using different constraints. The results of subsequently created scenarios may then be compared to one another or to the base scenario to determine which scenario best fits the user or corporation's tax objective (e.g., least tax liability) and business constraints (e.g., to keep different lines of business in separate sets of entities). Additionally, the scenarios and comparison results may be saved and further processed at a later time.

Figure 2:
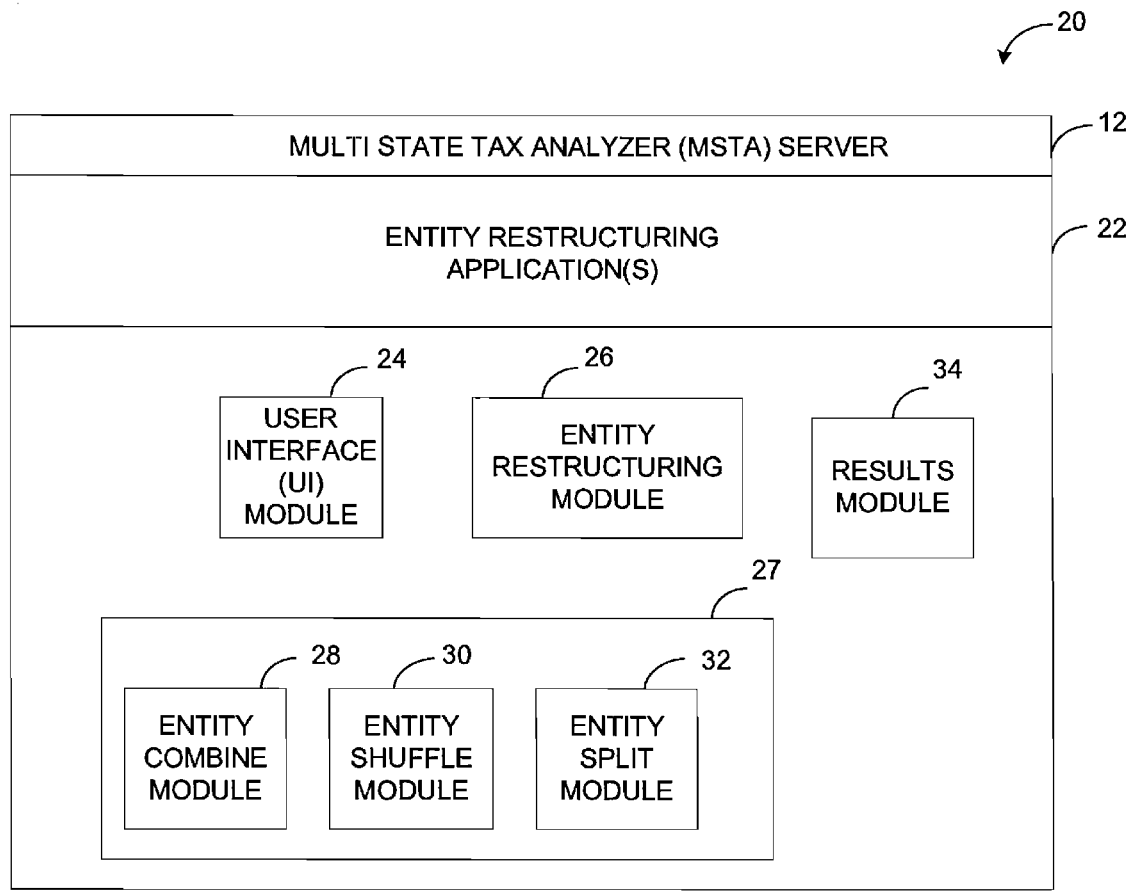
FIG. 2 is a block diagram illustrating an example embodiment of various blocks included in the MSTA system.

FIG. 2 is a block diagram 20, illustrating an example embodiment of a user interface module 24, an entity restructuring module 26, entity processing module 27 including an entity combine module 28, an entity shuffle module 30, and an entity split module 32, and a results module 34. In one example embodiment, these modules execute on the MSTA 12 under one or more entity restructuring applications 22. The entity restructuring module 26, entity combine module 28, entity shuffle module 30, and entity split module 32 execute operations corresponding to (legal) entity restructuring operations detailed below. The results module 34 and the UI module 24 are used to provide one or more interfaces to provide a user controls and indicators to run scenarios and display results.

In one embodiment, the entity restructuring application(s) 22 including the UI module 24 may provide one or more wizards to assist a user in utilizing the various functions of the MSTA 12. A wizard may be used when the user has a clear idea about how to restructure the base entity structure. For example which entities under the base entity structure to combine, split, or shuffle in order to achieve a tax objective. The MSTA 12 may accordingly use any or all of the modules of the one or more entity restructuring application(s) 22 to reach that objective. In one embodiment, when a wizard is run, the changes to the entity structure (e.g., merging or splitting entities) may automatically be applied to the current scenario and associated consequences processed and displayed. In one embodiment, the modified scenario and the results (e.g., assessed tax liabilities) may be reported to the user via the UI module 24, or saved in the database 13 or on the client machine 16.

In one embodiment, the entity restructuring application(s) 22 of the MSTA 12 may analyze a base entity structure or suggest alternative entity structure options to the base entity structure. In varying embodiments, when the analysis is run, the user may have the option to commit one of the suggested alternative entity structures to the scenario, save the scenario results, or discard them all. The entity restructuring application(s) 22 may not change the entity structure in the scenario until the user commits a scenario result, in which case the base entity structure may be replaced by the alternative entity structure created by the entity restructuring application(s) 22. A copy of the base entity structure may be saved on the data base 13 for possible future use or reference.

After analyzing the base entity structure, according to one embodiment, the results module 34 and the UI module 24 may analyze the scenario results and display, for example, views and reports of a quantitative comparison between each scenario. In various embodiments, the views and reports described may be displayed to a user via a user interface operating on a device, such as the client device 16. For example, once a user has run a wizard and/or committed scenario results, the user may choose from various viewing options and report choices to compare, from a tax perspective, the original entity structure to one or more potential new entity structures. In addition to viewing data at the entity level the entity restructuring application(s) 22 may be used to view and modify data, such as analysis views, data entry views, and reports.

In one embodiment, an analysis view operation may process and display data faster than a report process. The analysis view may also provide scenario-specific analysis that may not be found on the entity or group forms (e.g., Federal, Apportionment, and State). All analysis views may be exported to other data processing programs (e.g., Microsoft's Excel®, etc.) using an export view feature of the entity restructuring application(s) 22.

In one embodiment, data entry views may be used to modify data for multiple entities and jurisdictions at the same time. Data entry views may provide a convenient way to edit data across multiple years, entities, or jurisdictions. Data entry views may be exported to various other data processing programs. For example, the data entry views may be exported to a spreadsheet program (e.g., Microsoft's Excel®) to facilitate changing data that may be imported back into the MSTA 12. This example may allow a user to leverage a spreadsheet's functionality, such as mass copy/paste, etc., which may not be possible when simply "keying" data into the MSTA 12. In one embodiment, data entry views may be used to validate calculations, such as the rollup of IRS divisional 1120 forms into the legal entity 1120 form.

In one embodiment, reports may be generated via the results module 34 and used to display and print standard, entity structure, and customized reports. As mentioned above, these reports may include a comparison of scenarios, years, jurisdictions, tax rules, etc. for various simulated entity structures. In various embodiments, the reports may allow a user to compare virtually any aspect of a scenario across entities, years, jurisdictions, scenarios, etc. The reports may be generated in a spreadsheet format and/or customized for use in pivot tables, allowing flexibility in sorting and comparing data in any of a variety of user selected configurations. Reports may allow the user to quickly access and compare scenarios and focus on what or where they differ and how various differences may affect the tax liability of the organization.

In various example embodiments, the MSTA 12 may analyze the base entity structure and generated alternate entity structure results as described in any of the flow diagrams described herein by using one or more of the modules as described with reference to FIG. 2.

Figure 3:
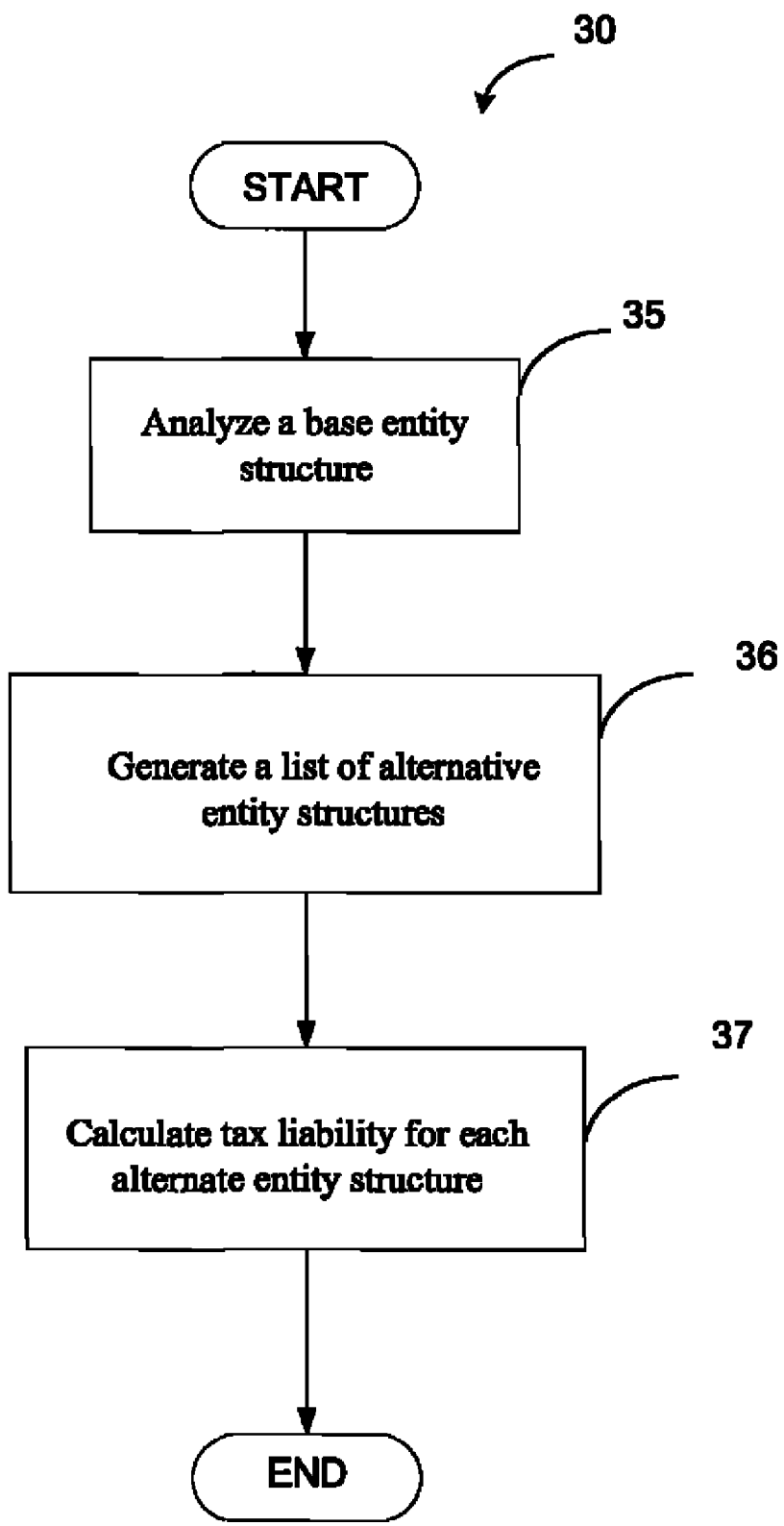
FIG. 3 is a flow diagram illustrating an example high level embodiment of the functionality of the MSTA server.

FIG. 3 is a flow diagram 30, illustrating an example embodiment of high level functionality of the MSTA server 12 and associated entity restructuring application(s) 22. At operation 35, a base entity structure is analyzed. For example, its associated tax liability (the initial tax liability) is computed. At operation 36 a list of alternative entity structures is generated. The analysis continues at operation 37 where a tax liability may be calculated for each alternate entity structure and may be compared to the tax liability of the base entity structure.

Figure 4:
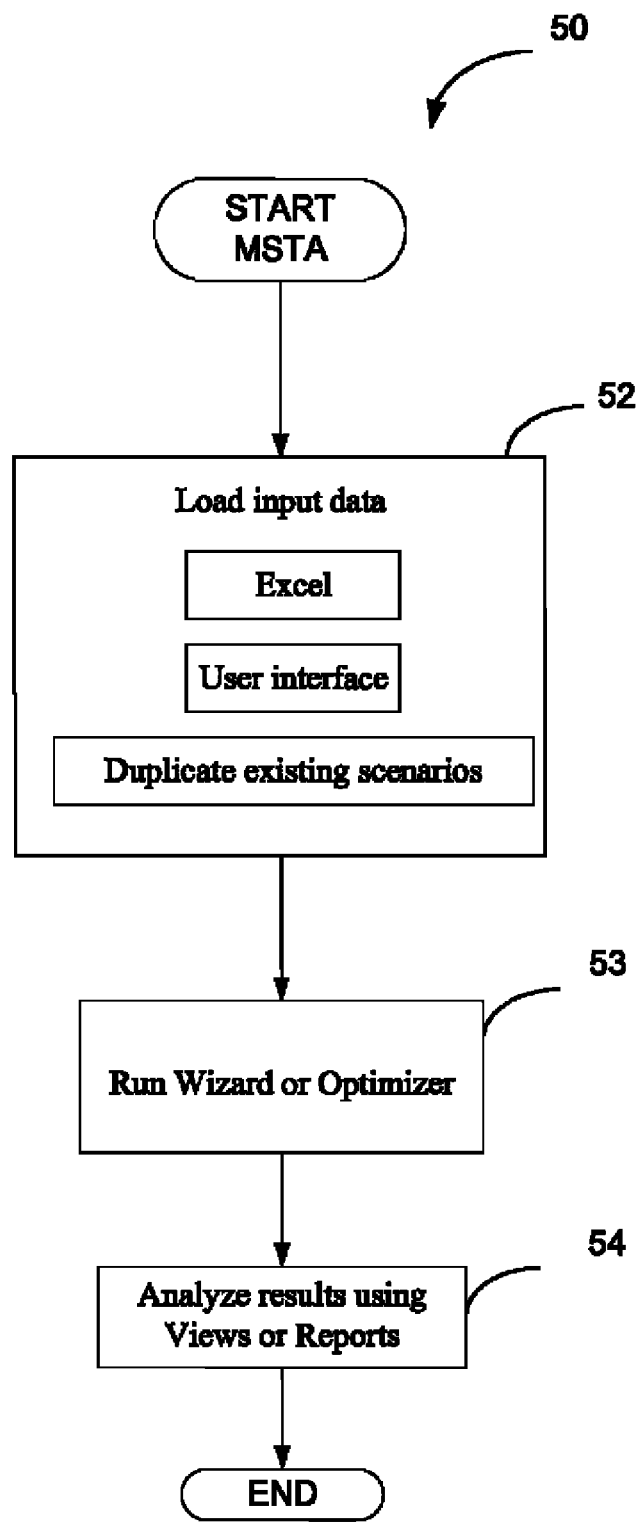
FIG. 4 is a flow diagram illustrating an example embodiment of the operations involved in a MSTA run.

FIG. 4 is a flow diagram 50, illustrating an embodiment of operations involved in an example analysis. At operation 52 a scenario including the relevant data is loaded. In one embodiment, data defining a scenario may be created or modified in three ways: (1) by loading data from an application (e.g., a spreadsheet program such as Microsoft's Excel®); (2) by entering data through a User Interface (UI); or (3) by duplicating an existing scenario already stored in the MSTA 12 (e.g., from the database 13). At operation 53 the tax consequences of changing the entity structure are analyzed. In one embodiment, as mentioned above, a wizard may be used when a user has a clear idea about how to restructure the base entity structure; in this case, the wizard automates the process of combining, splitting, and/or shuffling of the legal entities of the base entity structure. In another embodiment, the user can let the MSTA optimizers determine the best alternate entity structure from a tax perspective.

At operation 54, one or more reports may be generated allowing the user to understand the results of the realized or proposed changes. For example, a report may be generated including an alternate entity structure having a lower total tax liability than the base entity structure, and providing the user information on the origins of the tax savings.

Figure 5:
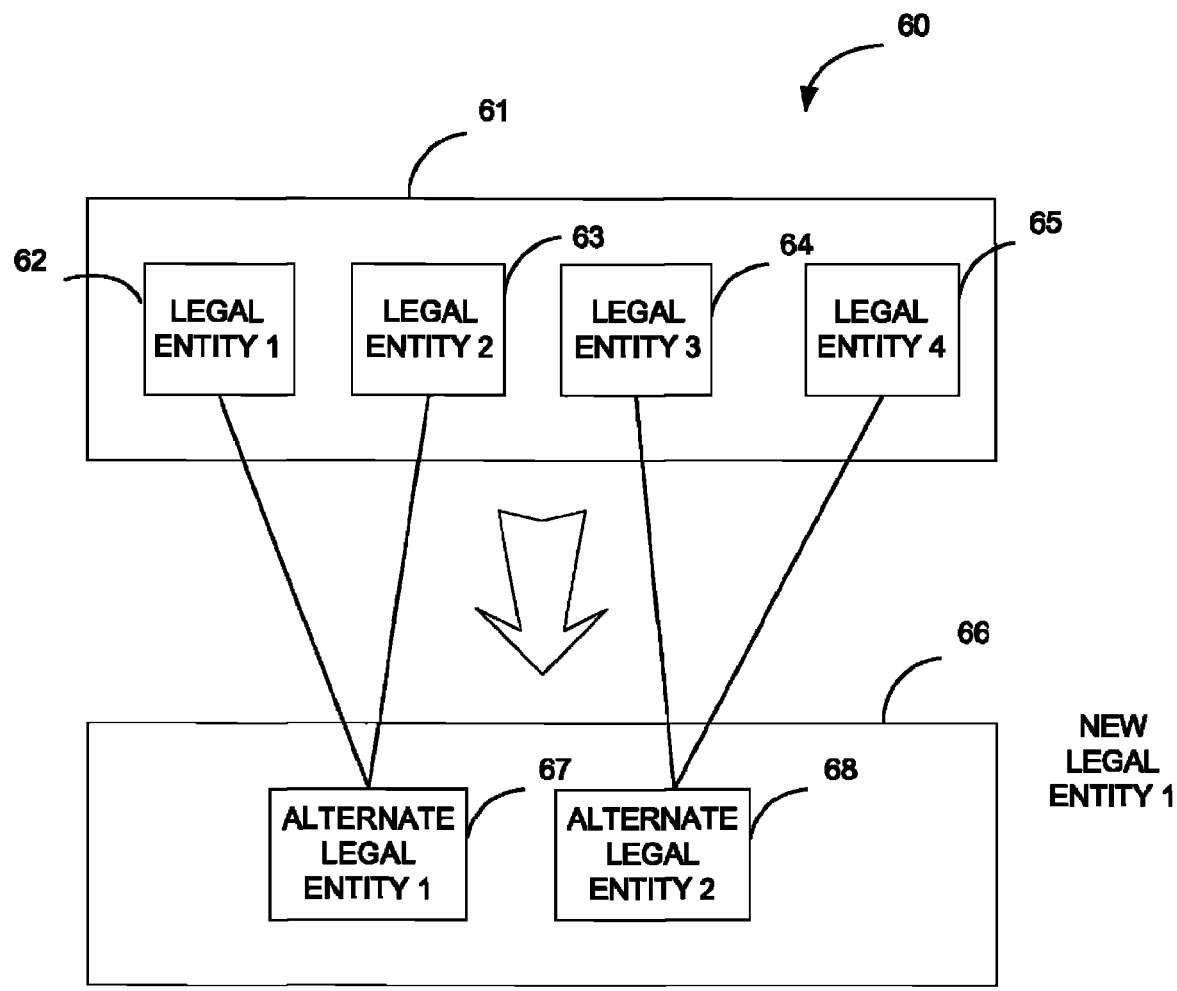
FIG. 5 is a block diagram illustrating an example embodiment of an entity combine process.

FIG. 5 is a block diagram 60, illustrating an example embodiment of an alternate entity structure after an entity combination of the base entity structure. In this example, the MSTA 12 creates an example alternate entity structure 66 consisting of alternate legal entities 67 and 68. In one embodiment alternate legal entity 67 is created from legal entities 62 and 63 and alternate legal entity 68 from legal entities 64 and 65. The MSTA 12 may determine the alternate entity structure 66 that has the lowest tax liability based on analyzing and comparing the tax consequences of the alternate entity structure 66 to the base entity structure and other alternate entity structures.

Figure 6:
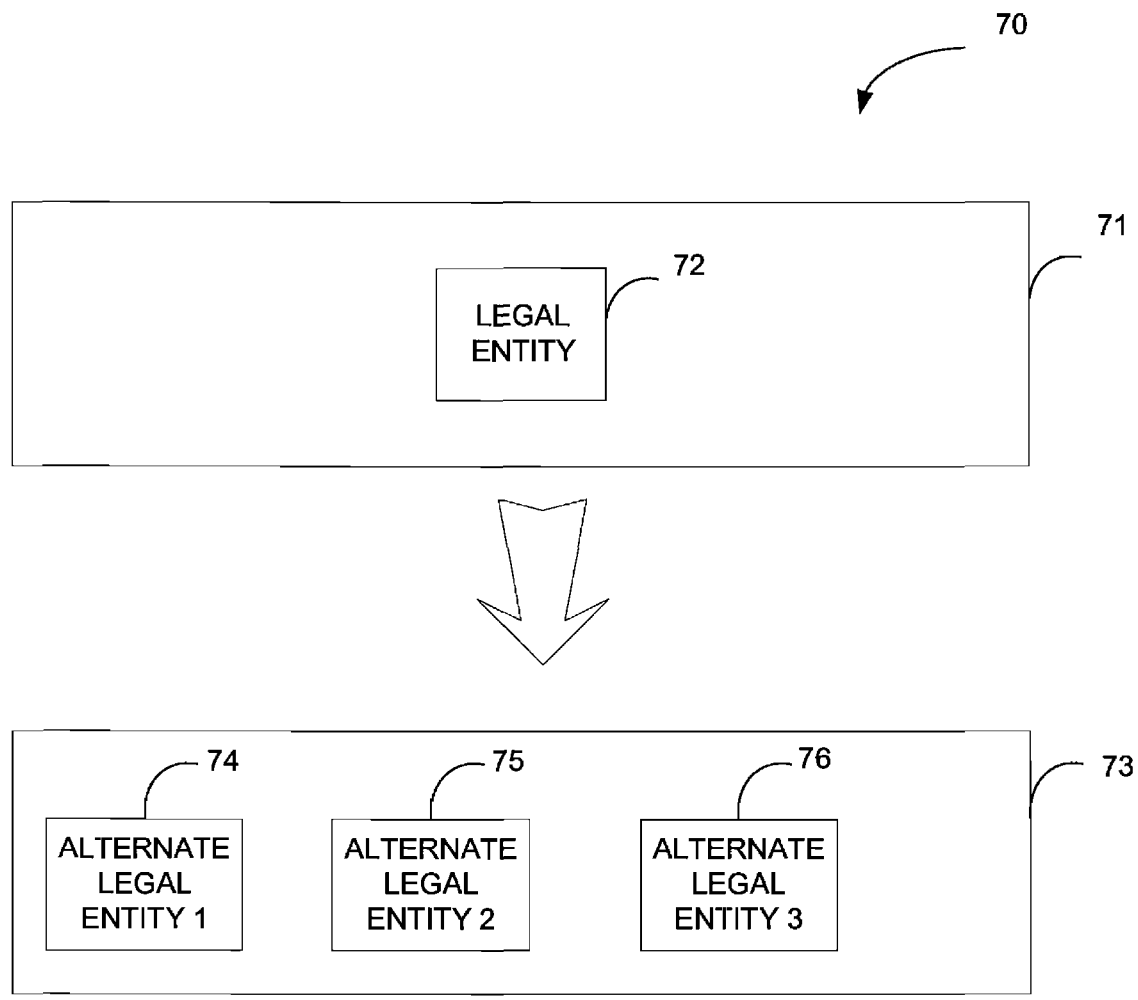
FIG. 6 is a block diagram illustrating an example embodiment of an entity split process.

FIG. 6 is a block diagram 70, illustrating an example embodiment of an alternate entity structure after an entity split of the base entity structure. In this example, the MSTA 12 creates an example alternate entity structure 73 including alternate entities 74, 75, and 76. The alternate entities 74, 75, and 76 are created as a result of splitting one or more legal entities. In this example the entity 72 of the entity structure 71 has been split into the alternate entities 74, 75, and 76. The MSTA 12 may determine the alternate entity structure 73 that has the lowest tax liability based on analyzing and comparing the tax consequences of the alternate entity structure 73 to the base entity structure and other alternate entity structures.

Figure 7:
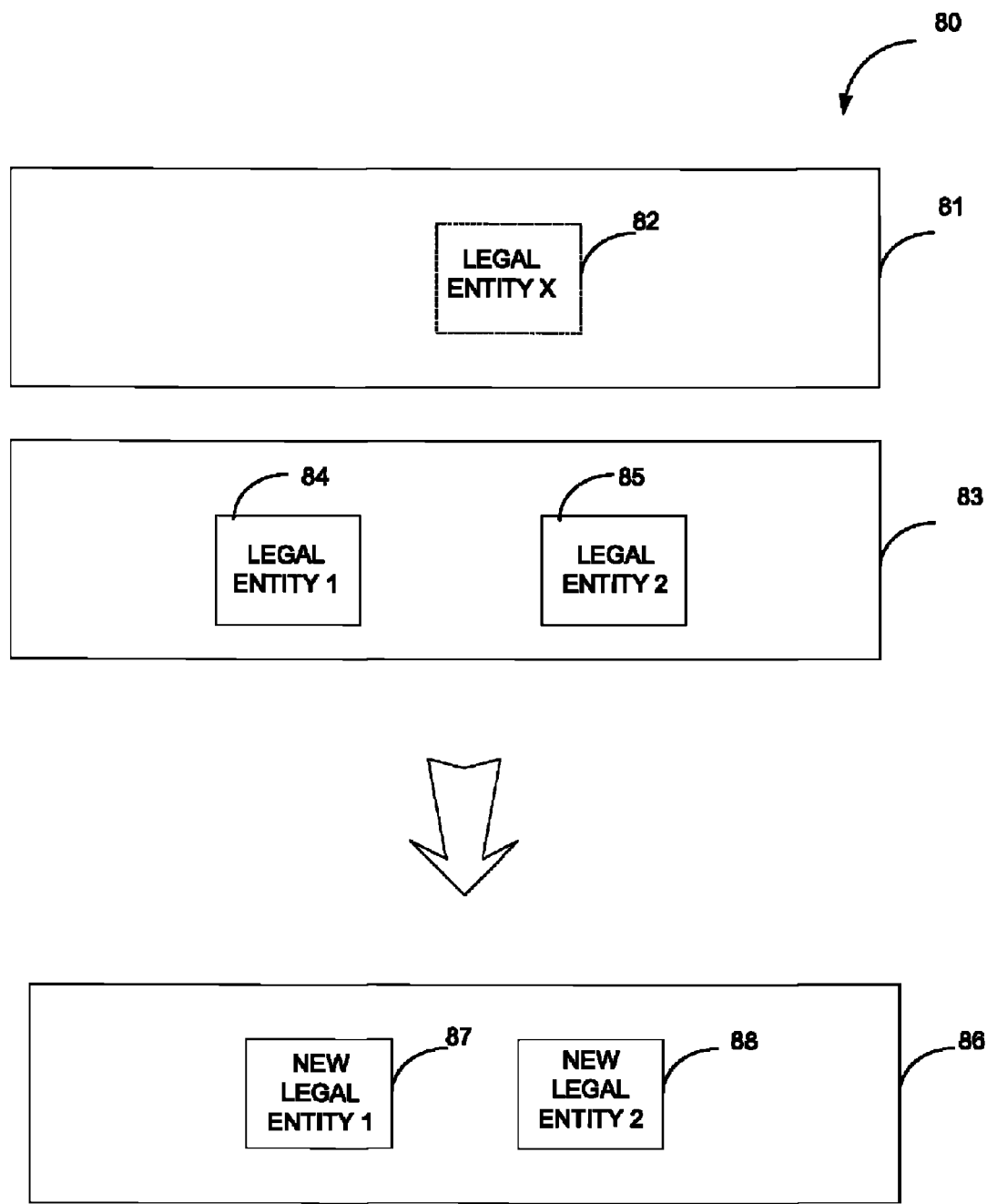
FIG. 7 is a block diagram illustrating an example embodiment of an entity acquisition and combine process.

FIG. 7 is a block diagram 80, illustrating an example embodiment of an alternate entity structure after an entity acquisition and combine process. In this example, the MSTA 12 creates an example alternate entity structure 86 including alternate legal entities 87 and 88. Alternate entity structure 86 may be created by the base legal entity structure 81 acquiring the entity structure 83 and its associated legal entities 84 and 85. These acquired legal entities 84 and 85 may be combined and/or shuffled with legal entity 82 to create the alternate legal entities 87 and 88 of alternate entity structure 86. The MSTA 12 may determine the alternate entity structure 86 that has the lowest tax liability based on analyzing and comparing the tax consequences of the alternate entity structure 86 to the base entity structure and other alternate entity structures.

FIGS. 8 to 15 are flow diagrams of example embodiments of various restructuring algorithms utilized by the MSTA system 10. In one embodiment, the entity restructuring application(s) 22 including its associated modules may utilize one or more entity restructuring algorithms to determine a tax-minimizing alternate entity structure. The restructuring algorithms may be used to model changes to an entity structure. The entity restructuring application(s) 22 may utilize one or all of combine, shuffle and split algorithms. In another embodiment, the entity restructuring application(s) 22 may evaluate all possible alternate entity structures. An example restructuring algorithm may work by comparing the total tax liability for a base legal entity structure and the total tax liability for an alternate entity structure. For example, if the computed tax liability in the alternate entity structure is lower, that structure may be listed as a preferred alternate entity structure.

In an example embodiment of entity restructuring application(s), an initial or base entity structure may be described in a variable (e.g., whichEntity[block]) as an assignment of different blocks (or sub-entities) to entities within an entity structure. A block may be a basic unit that the restructuring application may be allowed to move around to perform the restructuring process. Hereafter, the words "block" and "sub-entity" may be used interchangeably. For example, in various embodiments, a block may be a factory, a sales department, etc. Restructure, combine, shuffle and split are restructuring processes that include associated restructuring algorithms included in the one or more restructuring applications (e.g., entity restructuring application(s) 22).

In one embodiment, a user specifies which restructuring algorithms are to be used by indicating in which direction (e.g., via a user interface) the number of entities should evolve—lower (e.g., combine), same (e.g., shuffle), or higher (e.g., split). In one embodiment, each algorithm may be incorporated into a more general algorithm in which the MSTA 12 automatically runs all three (combine, split and shuffle) algorithms (and potentially several times each) in order to minimize the tax. Details describing the restructure, combine, split, and shuffle algorithms that may be used for a base entity structure optimization are presented below.

In one embodiment, a transfer pricing optimization may be performed at the same time as an entity structure optimization. For example, for every alternate entity structure considered during restructuring, the optimizer may search for the set of transfer prices that minimize the tax liability. The process may be performed for one or more transaction types selected by the user. For each transaction type, the optimization may occur within a price range selected by the user, reflecting business constraints or the results of transfer pricing studies. All the alternate entities' tax relevant information (e.g., income, factors, NOL balances, credits) may be automatically taken into account. In another embodiment, the transfer pricing optimization may be performed periodically to increase speed. In varying embodiments, the period may be set by a user, selected from a set of period options, or preconfigured by the MSTA 12.

Figure 8:
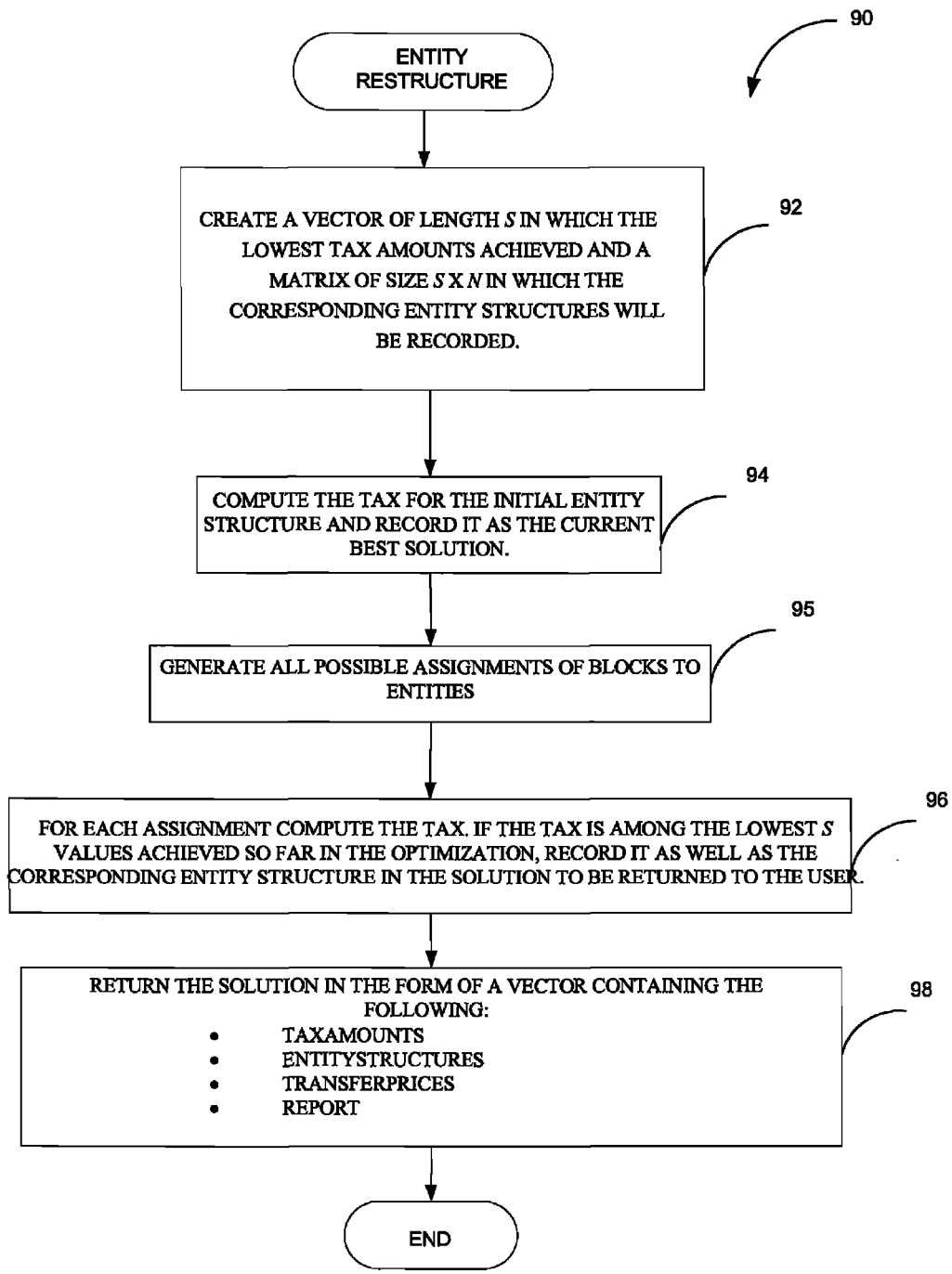
FIG. 8 is a flow diagram illustrating an example embodiment of an entity restructure algorithm.

FIG. 8 is a flow diagram 90, illustrating an example embodiment of an entity restructuring algorithm. In one embodiment, an initial or base entity structure (the organization's current structure) may be provided as a benchmark. The user may be allowed to specify the number of best solutions (e.g., the number of entity structures with the lowest tax liability) that the optimizer should return. Let S denote this number, and let N be the number of blocks in the problem.

The algorithm starts with operation 92, wherein a vector of length S is created in which the lowest tax amounts achieved will be stored and a matrix of size S×N is generated in which the corresponding entity structures will be recorded. At operation 94, the tax for the initial entity structure (if such a structure was provided) is computed and recorded as the current best solution. At operation 95, all possible assignments of blocks to entities are processed (set partitions in mathematics, see Bell number below). These assignments may be generated sequentially using restricted growth functions (e.g., given any restricted growth function value). The next value may be computed using a simple algorithm. For example, if there are 2 blocks, the two possible assignments are {0, 0} and {0, 1} and may be generated in that order. If there are three blocks, the five possible assignments are {0, 0, 0}, {0, 0, 1}, {0, 1, 0}, {0, 1, 1} and {0, 1, 2}, and may again be considered in that order. At operation 96, for each such assignment the tax is computed. If the tax is among the lowest S values achieved so far in the optimization, its value as well as the corresponding entity structure in the solution may be recorded and returned to the user through the UI module 24. At operation 98 the solution in the form of a vector containing the following 4 items is returned: 1) taxAmounts[solutionNumber]: The tax for each solution returned (double[ ]); 2) entityStructures[solutionNumber][block]: For each solution, the assignment of the blocks to entities (int[ ][ ]); 3) transferPrices[solutionNumber][transactionType]: For each solution, the set of transfer prices that minimizes tax (double[ ] [ ]); 4) report: A hashtable with some summary statistics (keys may be String, values may be double).

For N blocks, the number of possible assignments of blocks to entities is given by the Bell number of order N. Given the Bell numbers of orders 0 to N, the Bell number of order N+1 may be computed from the recurrence relation $$B_{N+1} = \sum_{k=0}^{N} B_k \frac{N!}{k!(N-k)!},$$

with $B_0=1$. Table 1 below illustrates the total number of possible cases (partions) as a function of the number of blocks in the problem.

TABLE 1

| # Blocks | # Cases |
| --- | --- |
| 1 | 1 |
| 2 | 2 |
| 3 | 5 |
| 4 | 15 |
| 5 | 52 |
| 6 | 203 |
| 7 | 877 |
| 8 | 4140 |
| 9 | 21147 |
| 10 | 115975 |
| 11 | 678570 |
| 12 | 4213597 |

In Table 1, the number of possible assignments grows rapidly and reaches more than 4 million cases for a problem with 12 blocks. As a result, this embodiment may become relatively slow when problems become large. A possible advantage of this example embodiment is that it is exact, or in other words, the best (lowest tax) solution is found with certainty.

In one embodiment, because of the large number of possible assignments an exception error may be generated for attempted calculations of more than a given number of blocks, for example, 12 blocks. This may be overridden if an override flag is set to true, in which case the solution may be attempted but may take a relatively long time to complete.

Prior year credit and NOL balances may pose a particular challenge because their balances may be tied to an existing legal entity structure and not to the blocks, which may be the primary objects of the restructuring process. In one embodiment, these prior year balances may be addressed by creating, for each existing entity, an additional block containing the prior year balances only (e.g., no scenario year data, such as income).

Figure 9:
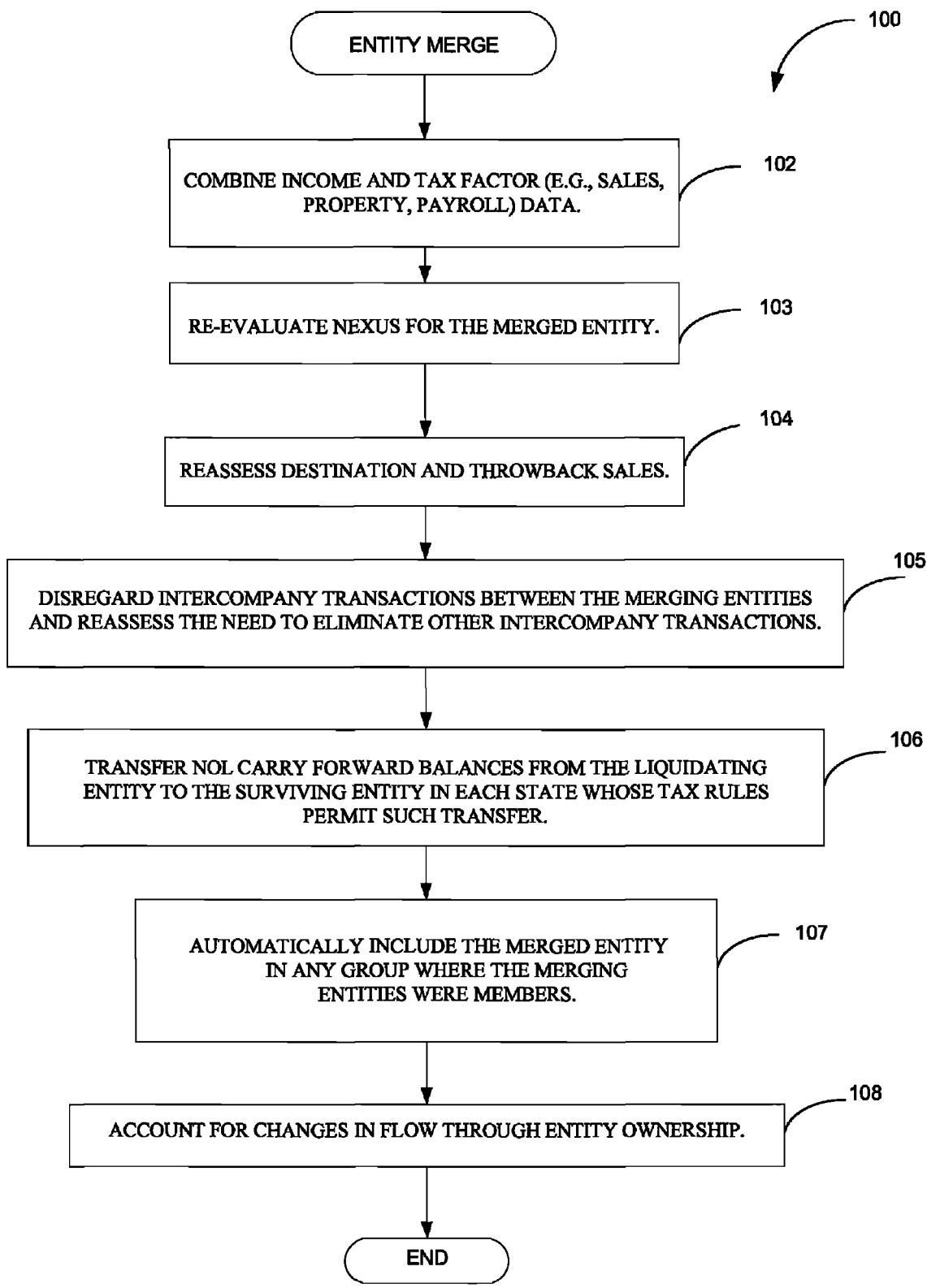
FIG. 9 is a flow diagram illustrating an example embodiment of an entity merge algorithm.

FIG. 9 is a flow diagram 100, illustrating an example embodiment of an entity merge process. At operation 102 income and tax factor (e.g., sales, property, and payroll) data are aggregated. At operation 103 nexus for the merged entity is re-evaluated. At operation 104 destination and throwback sales are reassessed. Then at operation 105 inter-company transactions between the merging entities are disregarded and the need to eliminate other inter-company transactions reassessed. At operation 106 NOL carry forward balances from the liquidating entity are transferred to the surviving entity in each state whose tax rules permit such transfer. At operation 107 the merged entity is automatically included in any group where the merging entities were members. Finally, at operation 108 changes in flow through entity ownership are accounted for.

In another embodiment, the entity combine module 28 may perform the above on a multi-year basis.

Figure 10:
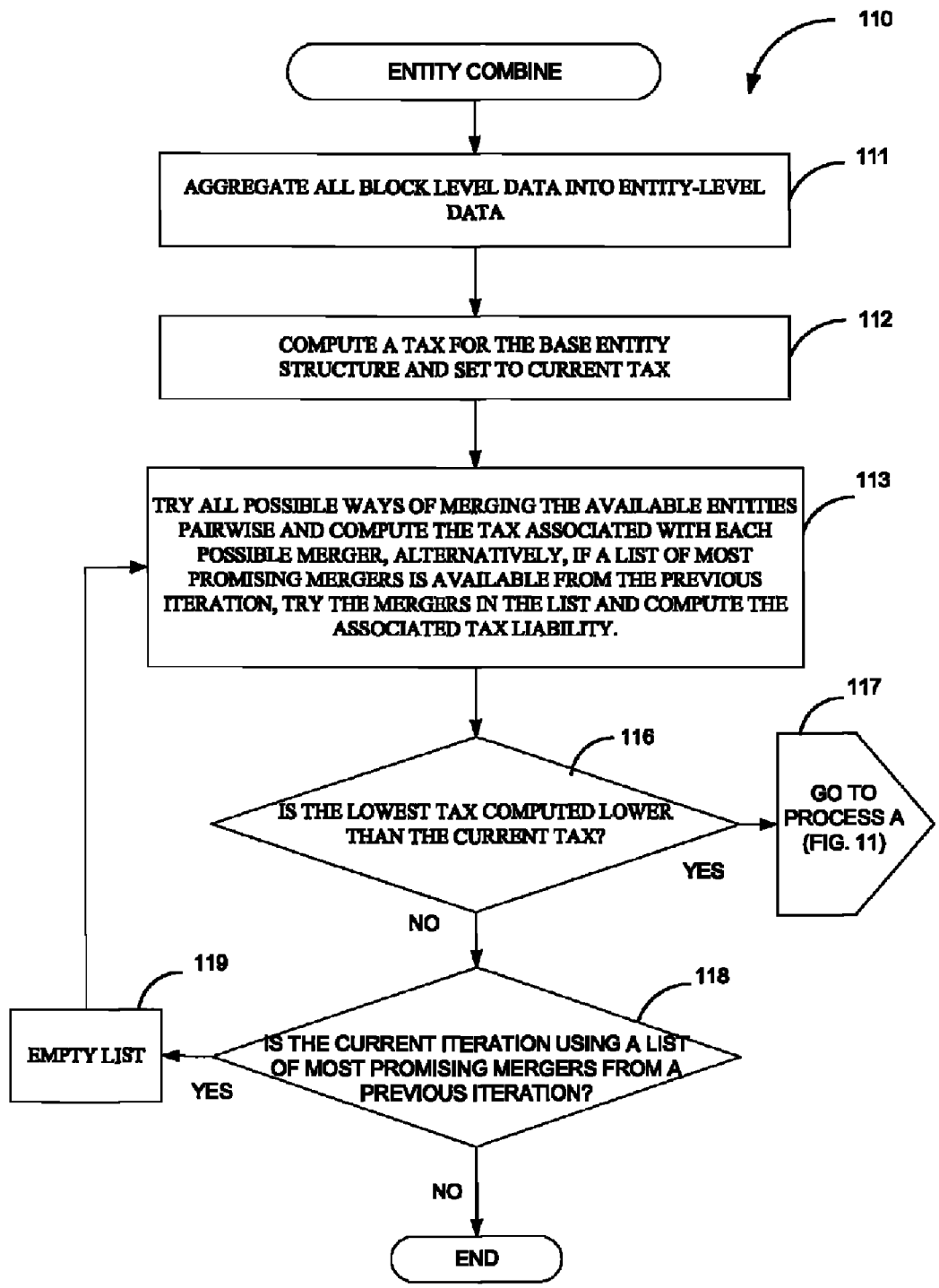
FIG. 10 is a flow diagram illustrating an example embodiment of an entity combine algorithm.

FIG. 10 is a flow diagram 110, illustrating an example embodiment of an entity combine algorithm. In one embodiment, the entity combine process includes an entity combine algorithm that may search for possible mergers among a set of selected legal entities of the base entity structure with the goal of minimizing the overall tax liability. Although it may not be exact (e.g., there may be no guarantee that it will find an absolute global minimum tax liability), the entity combine algorithm may provide relatively small deviations compared to the results provided by the entity restructuring algorithm discussed above.

In one embodiment, the solution of the entity combine algorithm may be presented to the user in the form of a number of operations, each operation representing a pair-wise entity merger. Committing results may lead the selected mergers to be performed in the system, automatically taking tax-relevant effects into account.

In one embodiment, the combine optimization may be subject to options and constraints including, but not limited to: 1) selection of which entities to (potentially) merge together; 2) selection of which entities should survive (e.g., not be liquidated even if involved in a merger); 3) options on how to group entities (e.g., which entities may be allowed to merge with which); 4) whether to take NOLs and credits into account in the computations; and 5) whether to allow separate merging entities to merge with group members.

In this example embodiment of the flow diagram 110, the entity combine algorithm starts at operation 111 where all block-level data is aggregated into entity-level data (hereafter, let N denote the number of entities). Then, at operation 112, the tax for the base entity structure (e.g., given the N entities in the scenario) may be computed and recorded and returned to the user along with the number of filings. Additionally, the current tax may then be set to equal the initial tax.

At operation 113, the tax associated with each possible merger of the available entities pair-wise is calculated. When doing so, the combine optimizer may perform computations analogous to those of the entity merge process 100.

In one embodiment, because it may not be possible to transfer prior year NOL and credit balances from the liquidating entity to the surviving one, it may be necessary to consider two cases for each pair of entities (e.g., merging the first into the second and the second into the first).

The potential mergers analyzed in operation 113 may be filtered according to particular options and constraints. For example, some options and constraints may be, "do not allow merging separate filing entities with group members," the "survivor" and the "grouping." In other words, according to one embodiment, the algorithm does not consider cases involving merging a separate filing entity with a group member if the user has specified that this should not occur via the options and constraints. It does not consider any merger which would lead an entity selected to be a survivor to be liquidated; and only considers mergers involving two entities with the same grouping option.

In order to enhance performance in subsequent iterations, as part of operation 113, a list of the most promising merger candidates (according to their associated tax liability) may be generated. For each such candidate, the process records which entity would be the survivor and which entity would be liquidated. If such a list is available from a previous iteration, the potential mergers analyzed in operation 113 may be limited to those contained in that list.

As part of operation 113, the merger candidate yielding the lowest tax may be recorded for retrieval in the current or future analysis. At operation 116 the tax liability of the merger candidate yielding the lowest tax is compared to the current tax value (as determined in operation 112 for the first iteration, and in operation 124, discussed below, for the subsequent ones). If the lowest tax of a computed alternate entity structure (via merger) is lower than the current tax, then at operation 117 the flow diagram continues at Process A of FIG. 11. If the tax calculations of the mergers are not lower than the current tax, then operation 118 drives what happens next as follows: (a) if the current iteration is using a list of most promising mergers generated in a previous iteration, that list is discarded, at operation 119, and the analysis continues at operation 113, (b) if the current iteration is not using such a list, the analysis is over and the results are communicated to the user. In one embodiment, the results returned may include a vector containing the following 7 elements: 1) taxAmounts [operation]: The tax for each operation returned (double[ ]); 2) entityStructures [operation][block]: For each operation, the assignment of the blocks to entities (int[ ][ ]); 3) transferPrices [operation][transactionType]: For each operation, the set of transfer prices that minimizes tax (double[ ] [ ]); 4) report: A hashtable with some summary statistics (keys may be String, values may be Double); 5) mergeEntity [operation]: for each operation, which entity gets liquidated (int[ ]); 6) intoEntity [operation]: for each operation, into which entity the liquidating entity gets merged; 7) numberOfFilings [operation]: For each operation, the number of separate filings.

Figure 11:
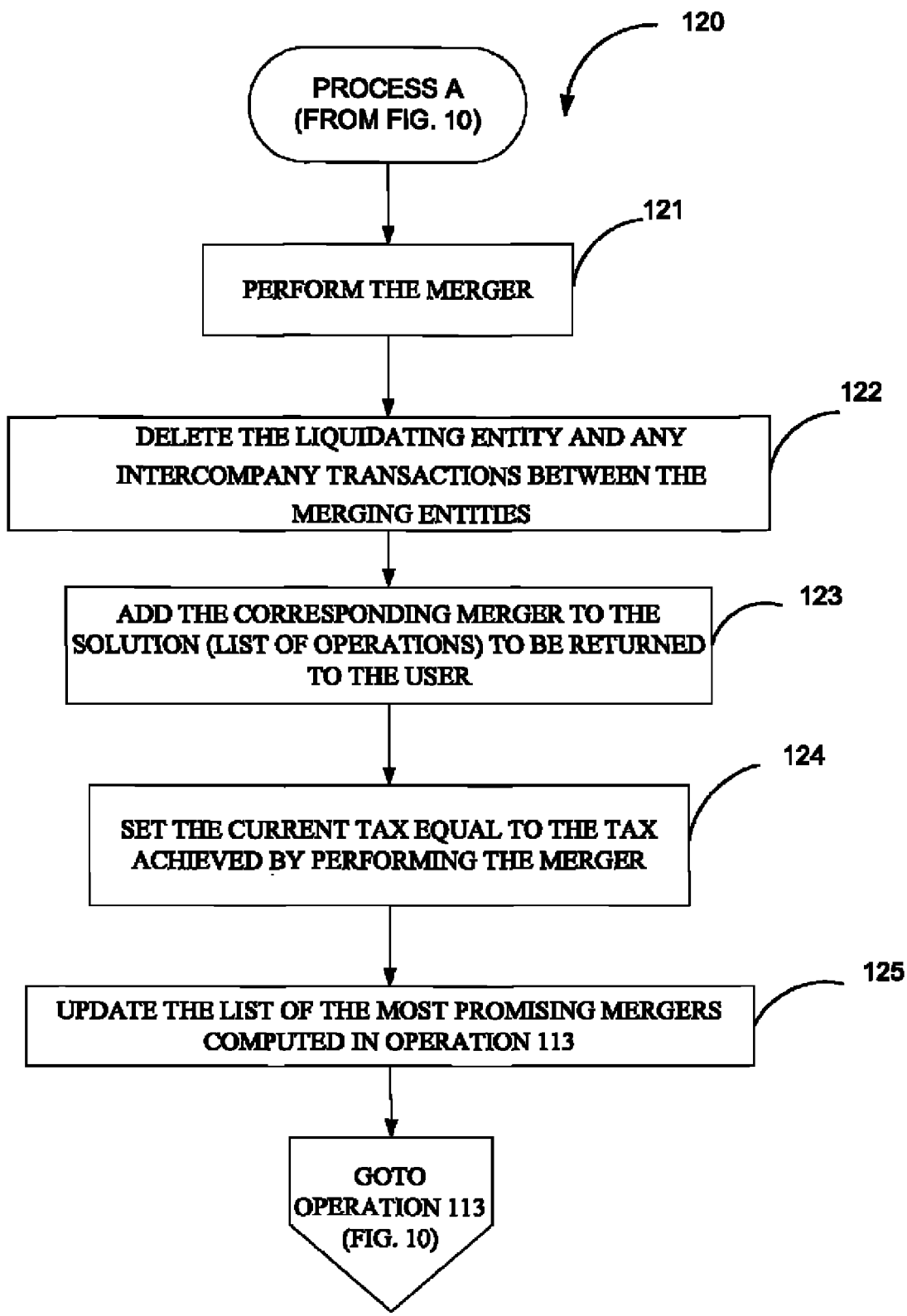
FIG. 11 is a flow diagram illustrating Process A continuing from the flow diagram of FIG. 10.

FIG. 11 is a flow diagram 120, illustrating Process A continuing from flow diagram 110 of FIG. 10. At operation 121 the selected merger is performed (e.g., aggregate two entities into one). Then at operation 122, the liquidating entity and any inter-company transactions between the merging entities are deleted and the control is passed to operation 123, where the corresponding merger is added to the solution to be returned to the user. At the next operation 124, the current tax is updated by setting it equal to the tax calculated based on the selected merger. Then the list of the most promising mergers created at operation 113 may be updated, at operation 125, along with any other relevant data pertaining to analysis. The updates may include removing the selected merger from the list, updating the identification (ID) of the liquidating entity to be the ID of the surviving one, and verifying all mergers in the list satisfy the options and constraints (e.g., the "do not allow merging separate filing entities with group members", the "survivor" and the "grouping" constraints). Finally, the analysis proceeds from operation 113 on the basis of the updated entity structure.

Detailed below is an example of determining a number of pair-wise combinations. Since at any given operation with N entities, there may be at most $N(N-1)$ ways to combine the entities pair-wise, the maximum number of cases to be examined may be given by $N(N-1)(N+1)/3$. If NOL and credit computations are ignored, then the question of which of the two entities is liquidated and which survives may be irrelevant, and there may be at most $N(N-1)/2$ ways to combine the entities pair-wise at each operation, so that the maximum number of cases to be analyzed may be given by $N(N-1)(N+1)/6$. The following table reports an example of the maximum number of cases that may be analyzed for a range of problem sizes. Using the list of most promising mergers generated in a previous iteration greatly reduces the number of cases to be analyzed; no values are reported here, since this reduction is largely data-dependent.

| Entities | Cases with NOLs and credits | Cases without NOLs and credits |
|---|---|---|
| 5 | 40 | 20 |
| 10 | 330 | 165 |
| 15 | 1120 | 560 |
| 20 | 2660 | 1330 |
| 25 | 5200 | 2600 |
| 30 | 8990 | 4495 |
| 35 | 14280 | 7140 |
| 40 | 21320 | 10660 |
| 45 | 30360 | 15180 |
| 50 | 41650 | 20825 |
| 60 | 71980 | 35990 |
| 70 | 114310 | 57155 |
| 80 | 170640 | 85320 |
| 90 | 242970 | 121485 |
| 100 | 333300 | 166650 |

Figure 12:
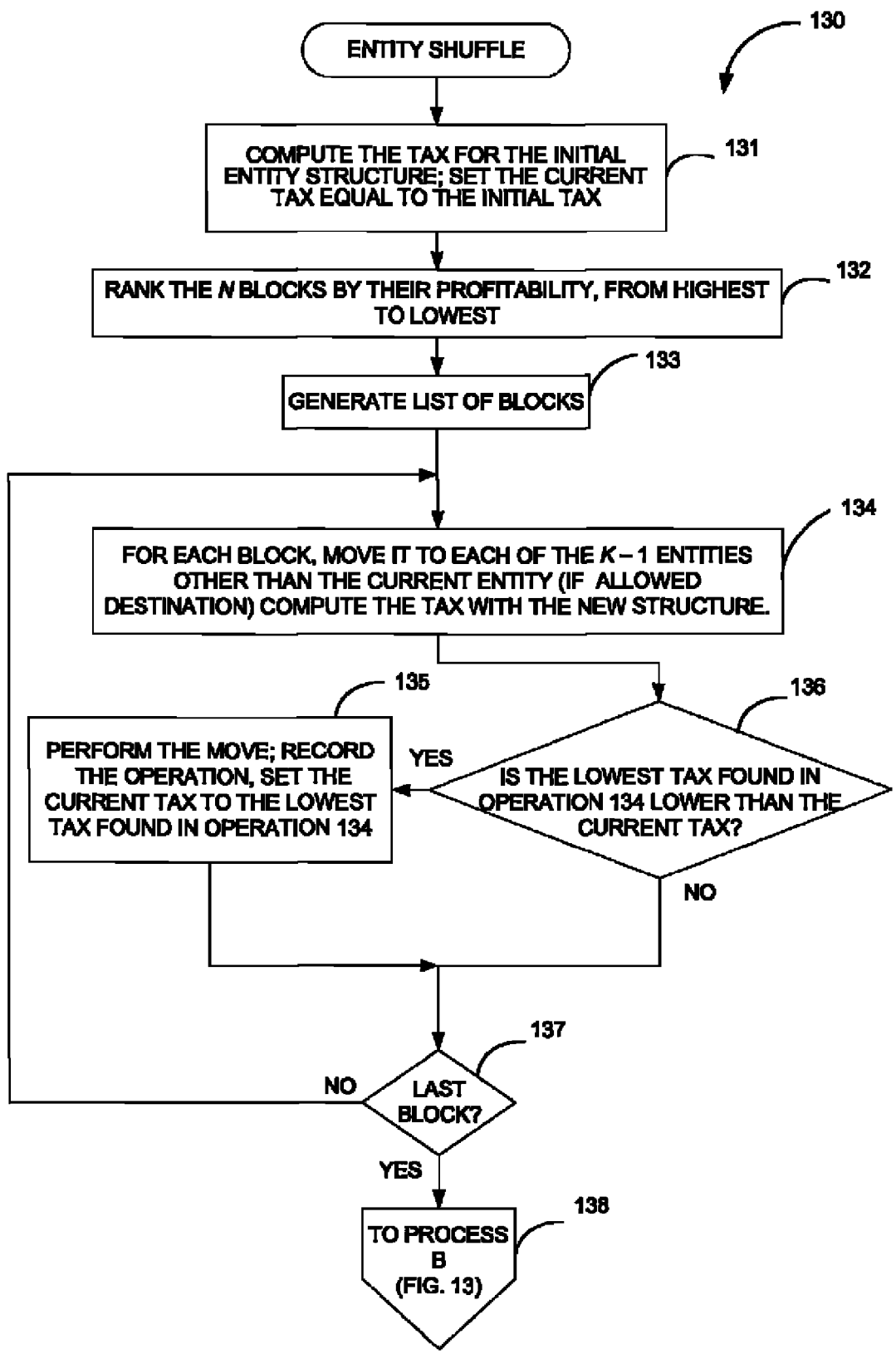
FIG. 12 is a flow diagram illustrating an example embodiment of an entity shuffle algorithm.

FIG. 12 is a flow diagram 130, illustrating an example embodiment of an entity shuffle process utilizing an entity shuffle algorithm. The entity shuffle process may seek an assignment of blocks to entities that reduces the tax burden without creating new entities. Thus, the new alternate entity structure will involve at most K entities, although the number may end up being lower if it reduces taxes. Let there be N blocks and K existing entities. Committing the results will lead the sub-entities with all their relevant data including income factors and inter-company transactions to be transferred from their current parent legal entity to an alternate parent legal entity proposed by the entity shuffle process.

The user options and constraints may include, but are not limited to: 1) which sub-entities the optimizer may be allowed to move; 2) for each selected sub-entity, which of the existing legal entities the optimizer may be allowed to place it in; 3) whether to take NOLs and Credits into account in the computations.

Returning to FIG. 12, at operation 131, the tax for the initial entity structure is computed and the current tax is set equal to the initial tax. At the next operation 132, the N blocks are ranked by their profitability from highest to lowest and at operation 133 a corresponding block list is generated. At operation 134, the lowest tax liability found so far is set to the current tax liability, and the list of blocks may then examined from top to bottom: for each block in the list which the user has specified to be movable, an attempt is made to move it to each of the K−1 entities other than the current entity, provided that the user has specified these entities to be allowed destinations for the block considered, and the tax with the new structure is computed. If the tax liability is lower than the lowest tax liability found so far, the move is stored for later use and the lowest tax liability found so far updated. At operation 136, if the lowest tax achieved by moving this block to another entity (as determined as part of operation 134) is lower than the current tax, then at operation 135 the move is executed, the appropriate operation is recorded, and the control is passed to decision operation 137. If at operation 136 the lowest tax is not achieved the control is passed to decision operation 137. Decision operation determines if the block is the last in the list. If so, the control is passed to process B (See FIG. 13); otherwise, the process continues (loops) back up to operation 134.

Figure 13:
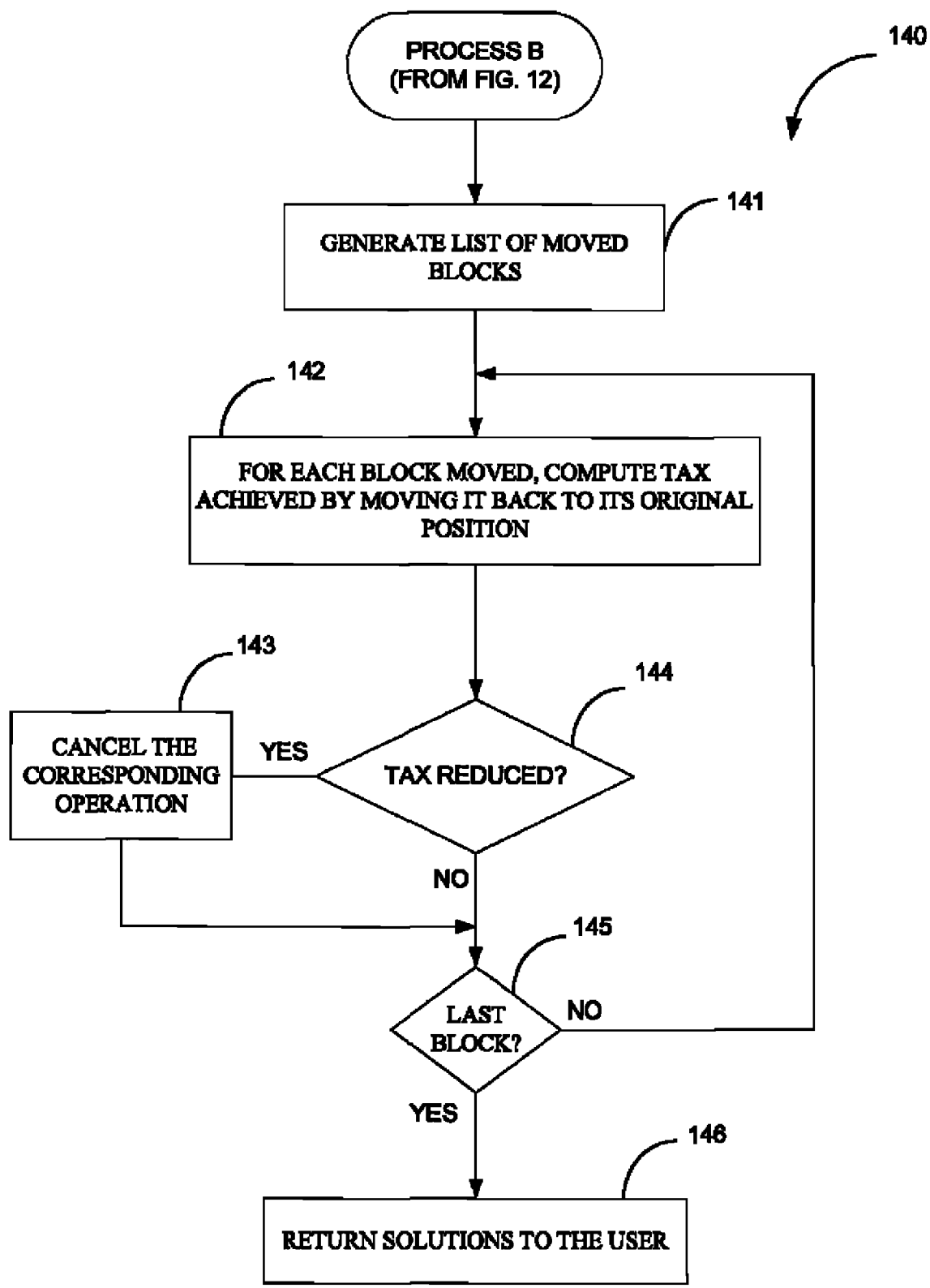
FIG. 13 is a flow diagram illustrating process B continuing from the shuffle diagram of FIG. 12.

FIG. 13 is a flow diagram 140, illustrating process B, continuing from of the entity shuffle process of FIG. 12. At operation 141, the list of blocks that were moved is constructed. At operation 142, the tax liability achieved by moving the block back to its original position is computed. If it is determined at operation 144 that the tax could be reduced (below the current tax) by moving the block back, the corresponding move operation is cancelled, the current tax is updated and control is passed to decision operation 145. If it is determined at operation 144 the tax can not be reduced, control is passed to decision operation 145. Decision operation 145 examines whether the block considered is the last block in the list of moved blocks. If the block is not the last block in the list, then the process continues (loops) back to operation 142 to examine the next block in the list. If it was the last block then at operation 146 the solutions are returned to the user.

Figure 14:
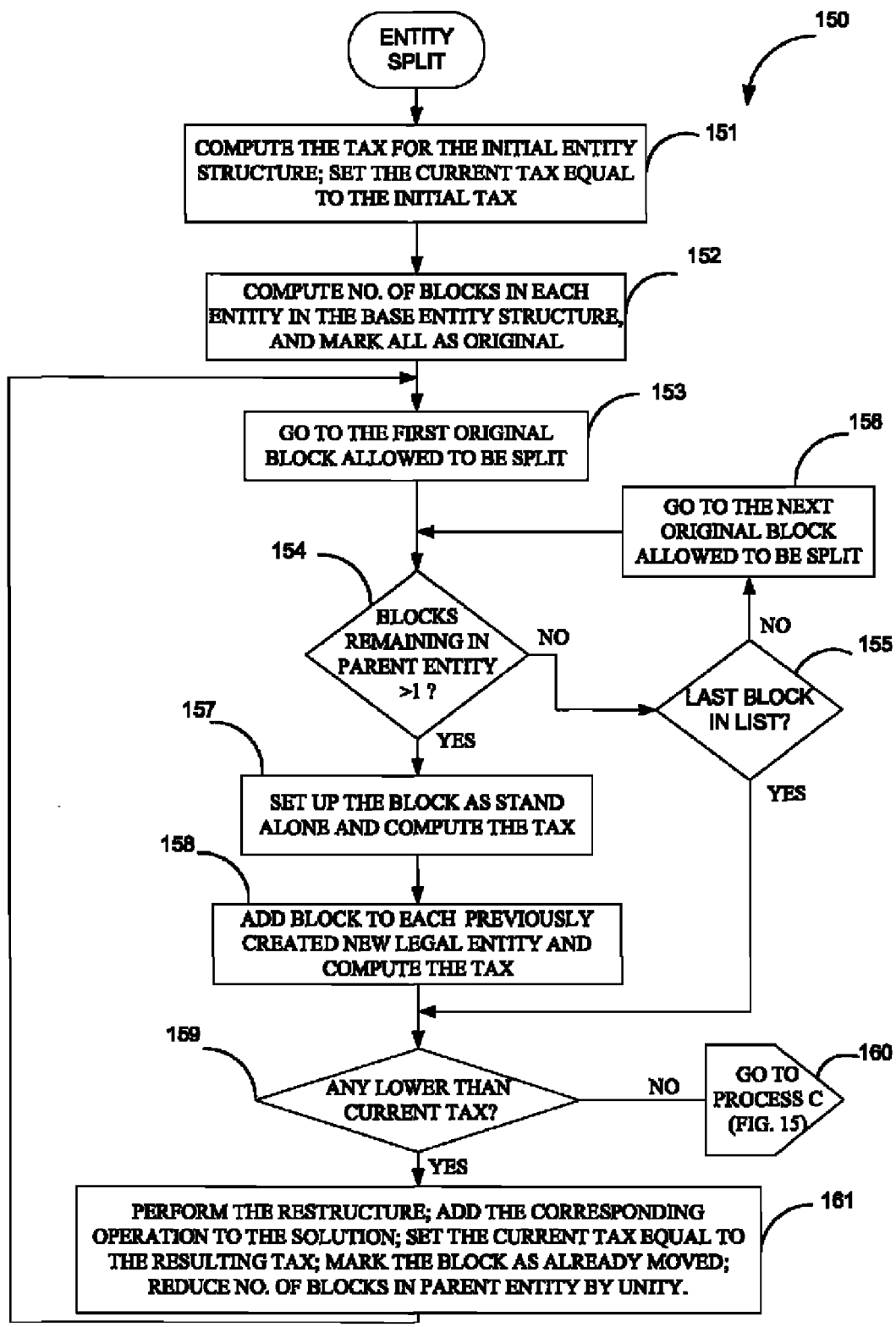
FIG. 14 is a flow diagram illustrating an example embodiment of an entity split algorithm.

FIG. 14 is a flow diagram 150, illustrating an example embodiment of an entity split process including an entity split algorithm. The entity split algorithm may be used to carve blocks out of existing (legal) entities and place them into newly created entities to create a new alternate entity structure to reduce the tax.

User options and constraints may include but are not limited to: 1) selection of which sub-entities to be (potentially) carved out of their current entity; 2) selection of which sub-entities to be set up as standalone entities if split from their current entity; 3) options on how to group sub-entities that have been split into newly formed entities; 4) whether to take NOLs and credits into account in the computations.

In one embodiment, the solution may be presented to the user in the form of a number of operations, each operation representing the transfer of an individual sub-entity into a new entity. Committing results will lead to the creation of new entities and to the transfer of sub-entities specified by the optimizer (including all their relevant data such as income, factors and inter-company transactions) into these new entities.

Returning to FIG. 14 at operation 151, the tax and the number of filings for the initial entity structure are computed and recorded for reporting purposes. The current tax is set equal to the initial tax. At operation 152, the number of blocks in each entity in the initial structure is determined, and all blocks not yet moved are marked as "original." Operation 153 begins the examination process for the blocks that the user has allowed to be split and are original. At operation 154, if the number of blocks remaining in the parent entity is one, then operation 155 examines whether the block is the last block in the set of original blocks allowed to be split. If not, the process loops back to the next original block allowed to be split at operation 156; if so, the process continues with operation 159, described below. If the number of blocks remaining in the parent entity exceeds one, then at operation 157 the block is set up as standalone in a newly created entity and the associated tax liability computed. At operation 158, the block is added to each previously created new legal entity that has the same recombine grouping option as the block being considered and the tax liability of each case computed. In one embodiment, operation 158 is dependent upon the user having not restricted the block to be set up as a standalone entity only. In operations 157 and 158, if the tax liability is lower than the lowest value found so far, then that value is updated and the restructuring operation yielding that lowest value recorded for future use.

Once all original blocks allowed to be split have been analyzed in this fashion, if at operation 159 the lowest tax found (in operations 157 and 158) lies below the current tax then at operation 161 the restructuring corresponding to the lowest achievable value (across all cases that were investigated) is performed. For example, the block selected may be carved out and put in either a newly created entity or in one of the previously created new entities. The block being moved and the corresponding operation (e.g., operation 157 or 158) yielding the result may be recorded in the set of solutions to be returned to the user. For example, which block is being carved out, in which entity it is being placed, and whether a new entity is created by performing the operation. The current tax may then be set equal to the lowest tax as calculated. Additionally, at operation 161, the block may be marked as not original and the number of blocks remaining in the parent entity reduced by unity.

Figure 15:
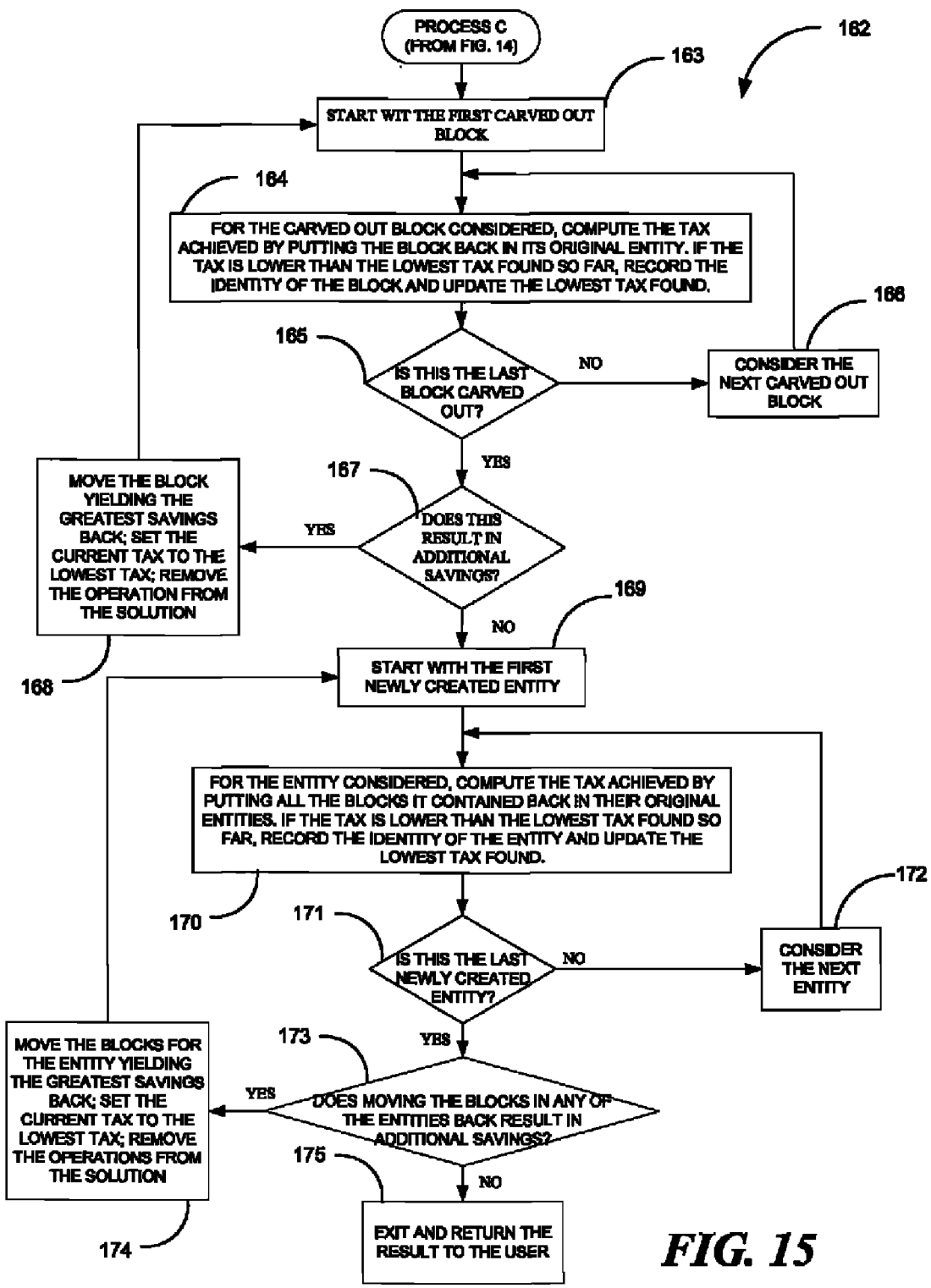
FIG. 15 is a flow diagram illustrating Process C, continuing from the flow diagram of FIG. 14.
Figure 16:
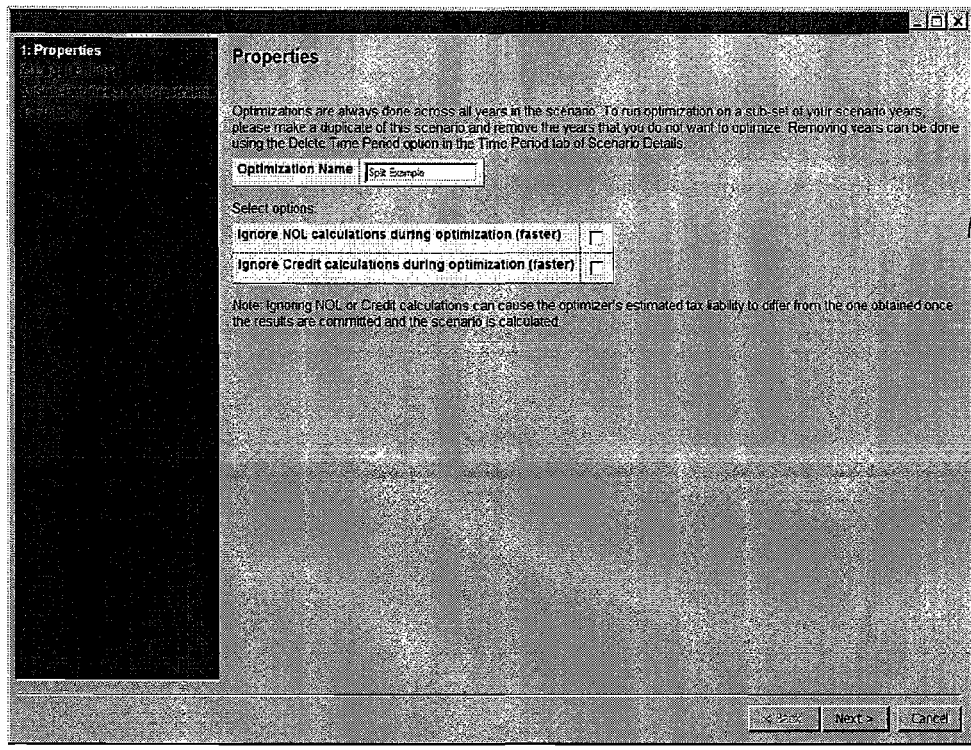
FIG. 16A is a screen shot illustrating an example embodiment of a first user interface associated with a split optimizer run providing input data.
FIG. 16B is a screen shot illustrating an example embodiment of a second user interface associated with a split optimizer run providing input data.
FIG. 16C is a screen shot illustrating an example embodiment of a third user interface associated with a split optimizer run providing input data.
FIG. 16D is a screen shot illustrating an example embodiment of a fourth user interface associated with a split optimizer run.
Figure 16:
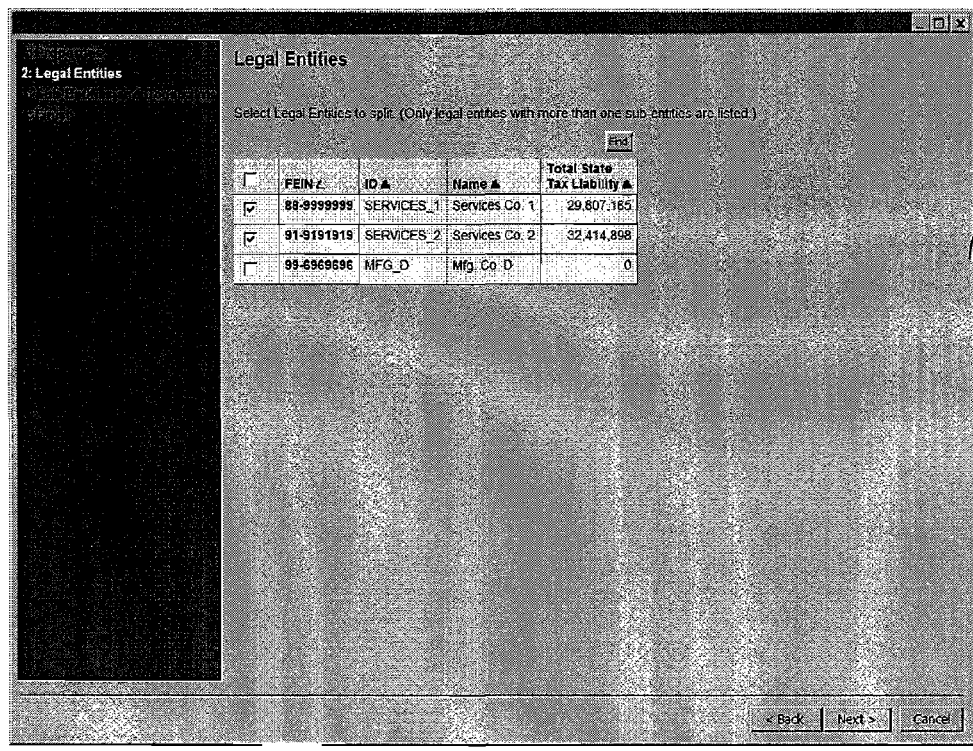
Figure 16:
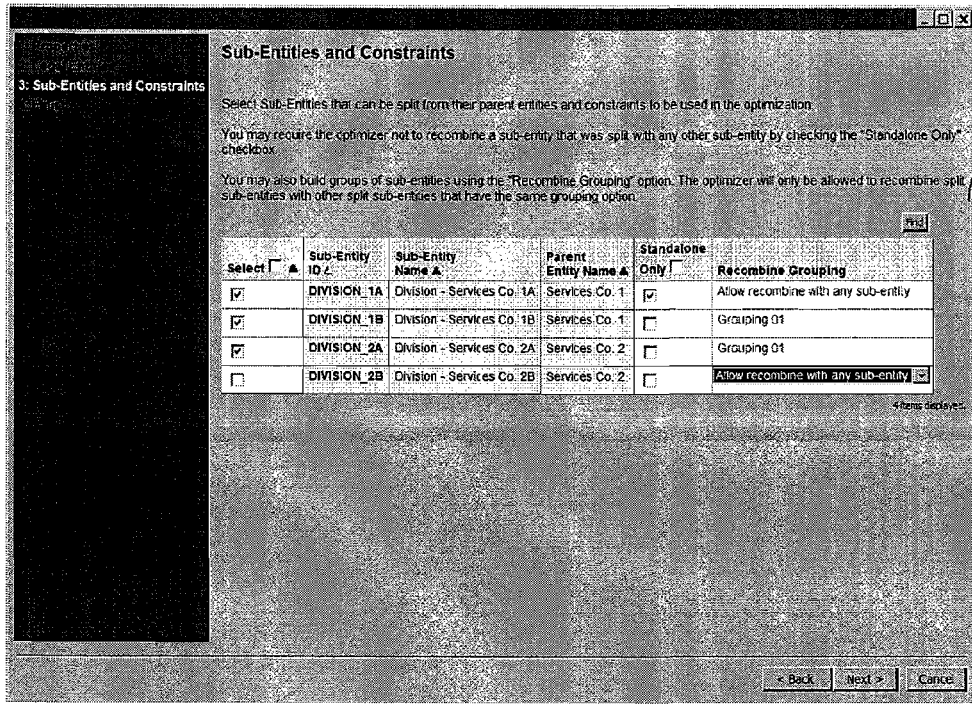
Figure 16:
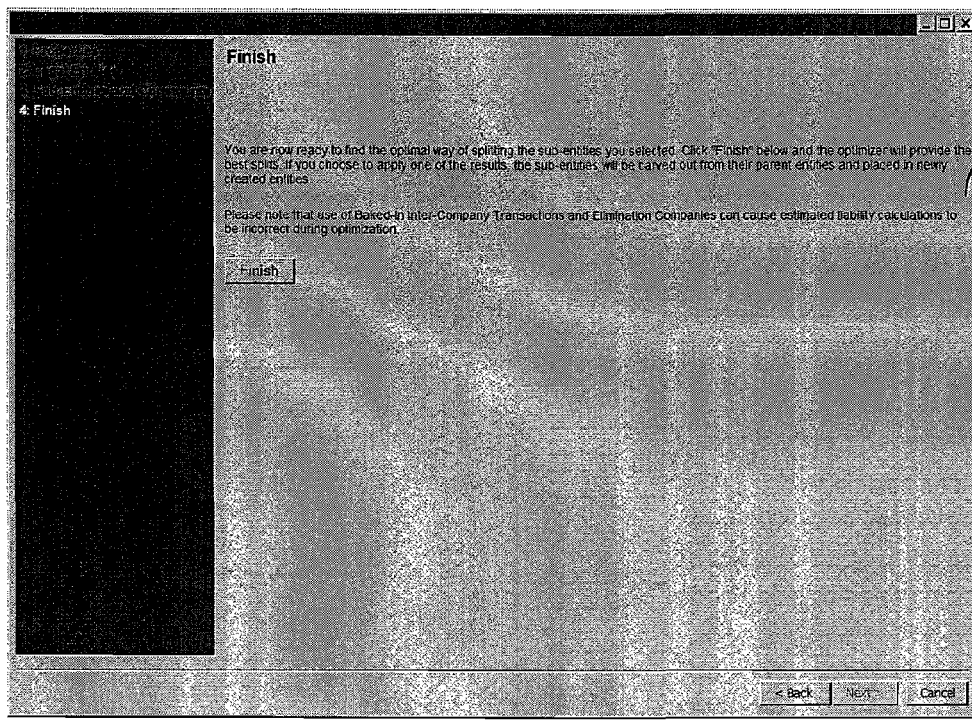
Figure 17:
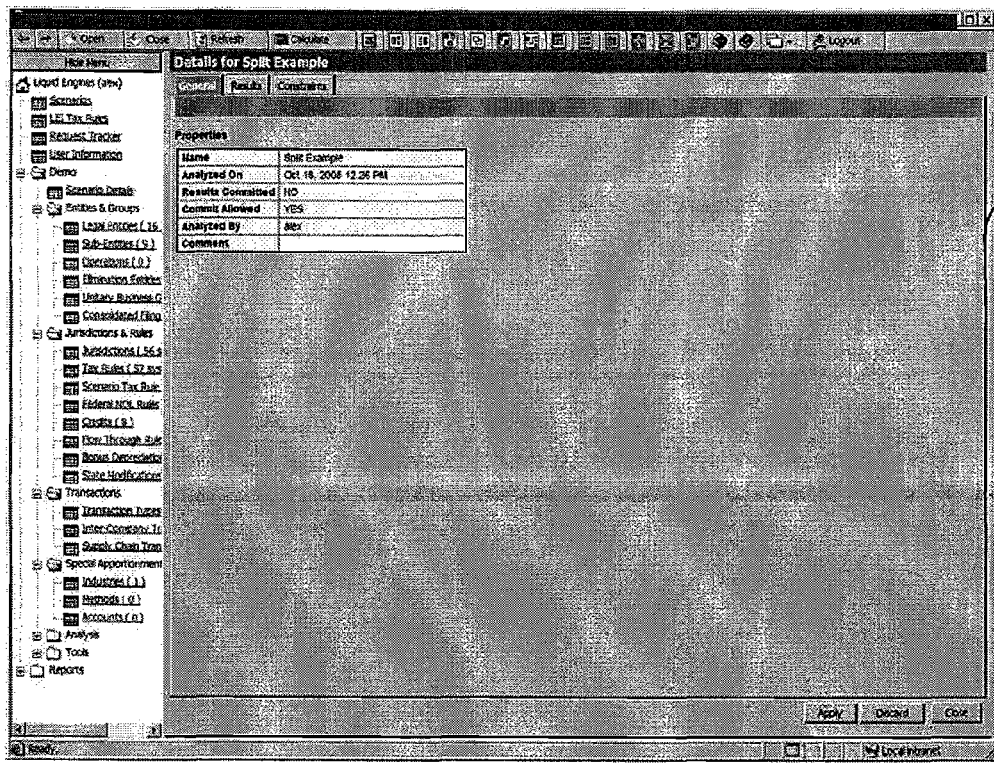
FIG. 17A is a screen shot illustrating an example embodiment of a first user interface associated with providing split entity optimization results.
FIG. 17B is a screen shot illustrating an example embodiment of a second user interface associated with providing split entity optimization results.
FIG. 17C is a screen shot illustrating an example embodiment of a third user interface associated with providing split entity optimization results.
Figure 17:
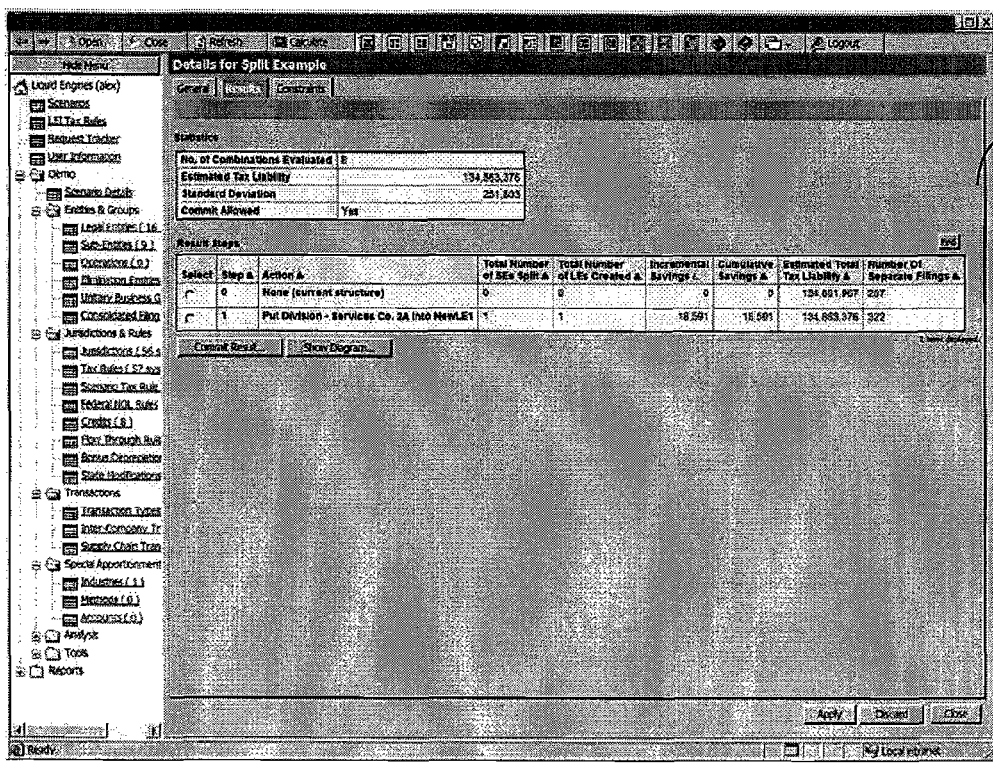
Figure 17:
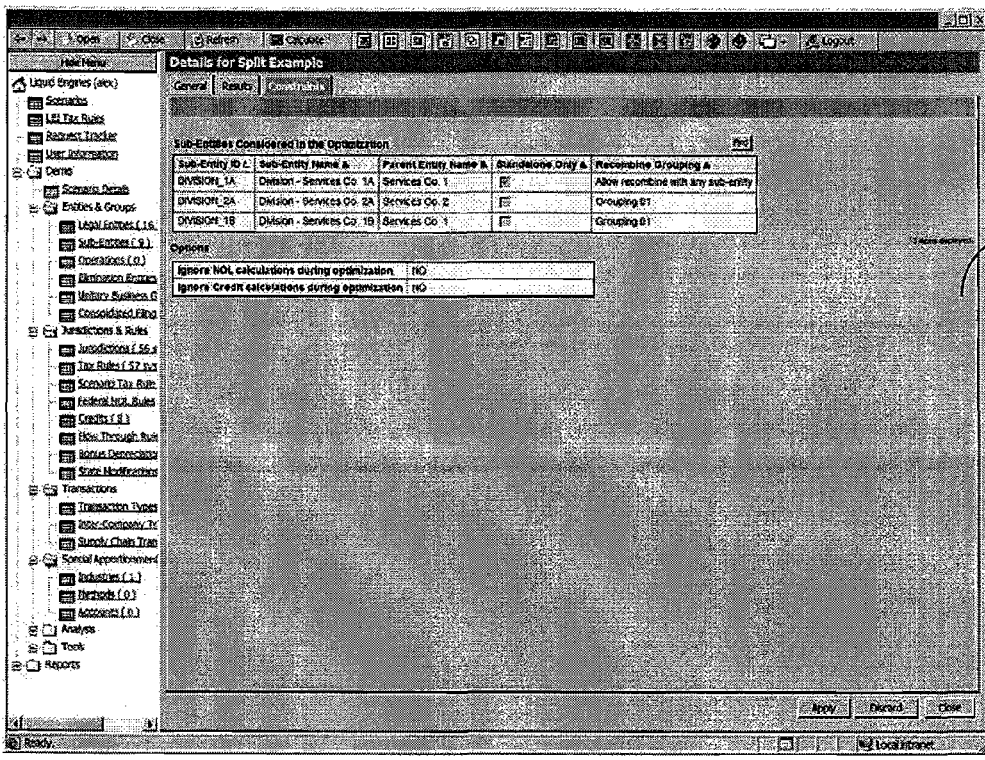
Figure 18:
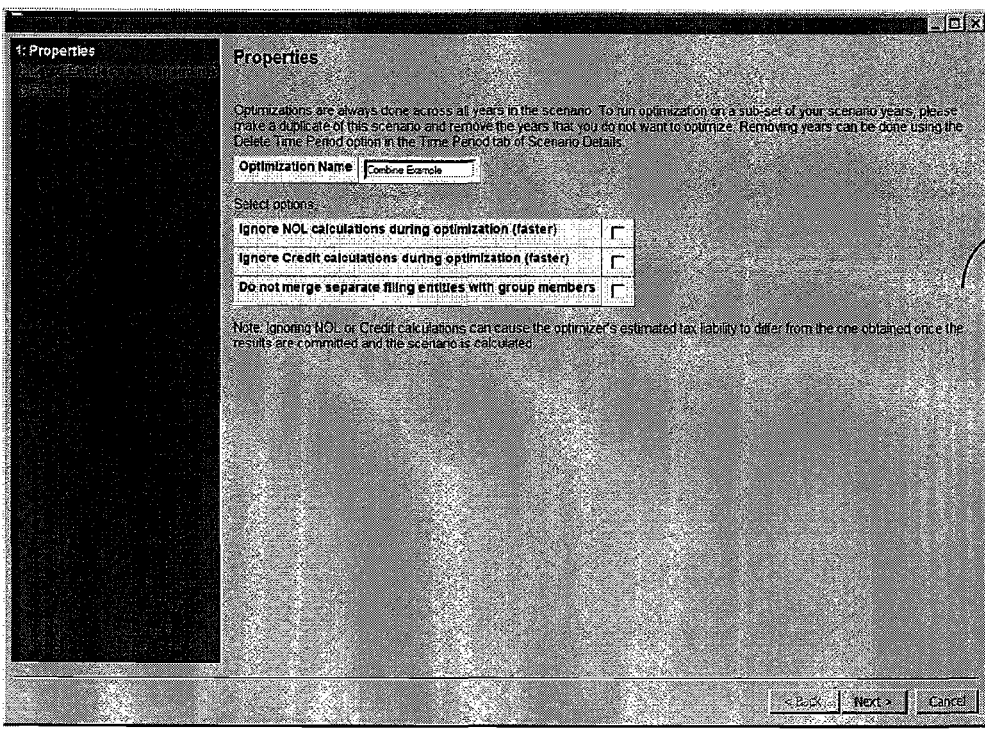
FIG. 18A is a screen shot illustrating an example embodiment of a first user interface associated with a combine optimizer run providing input data.
FIG. 18B is a screen shot illustrating an example embodiment of a second user interface associated with a combine optimizer run providing input data.
FIG. 18C is a screen shot illustrating an example embodiment of a third user interface associated with a combine optimizer run.
Figure 18:
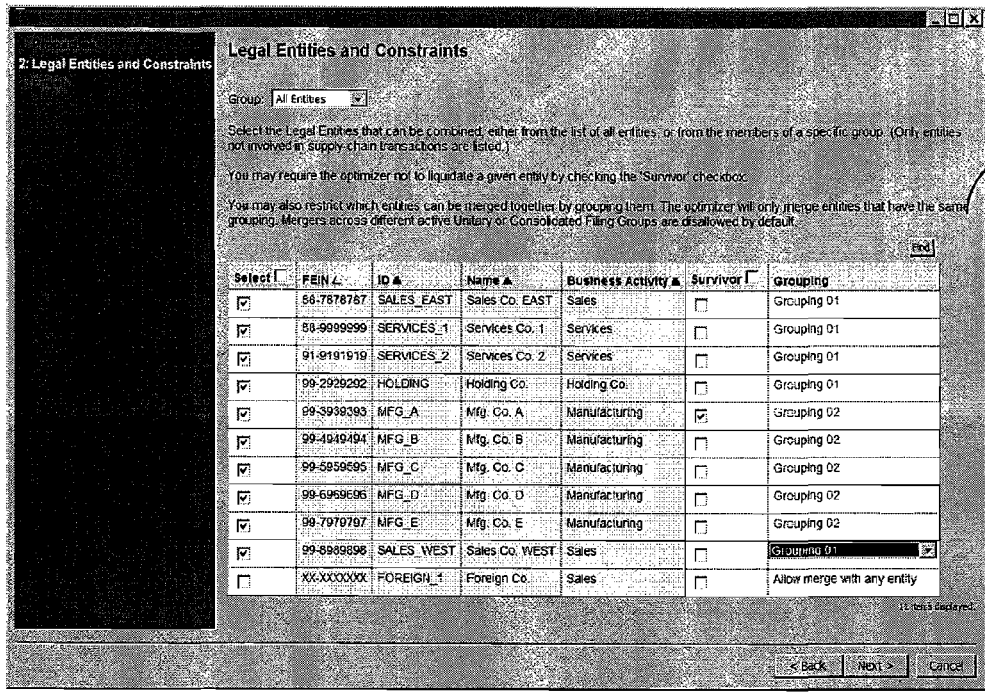
Figure 18:
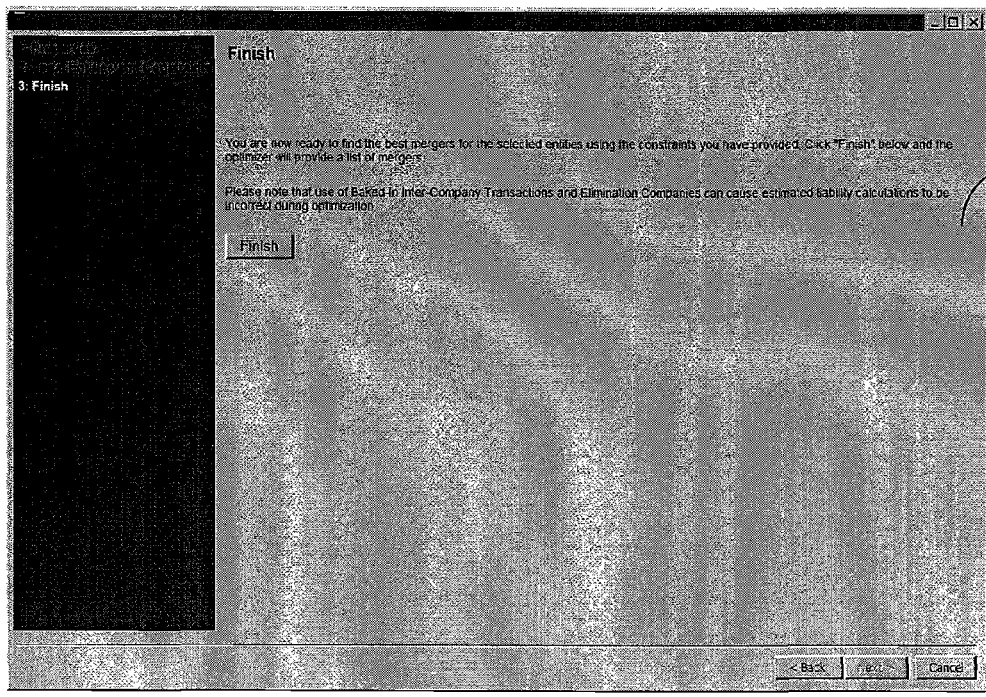
Figure 19:
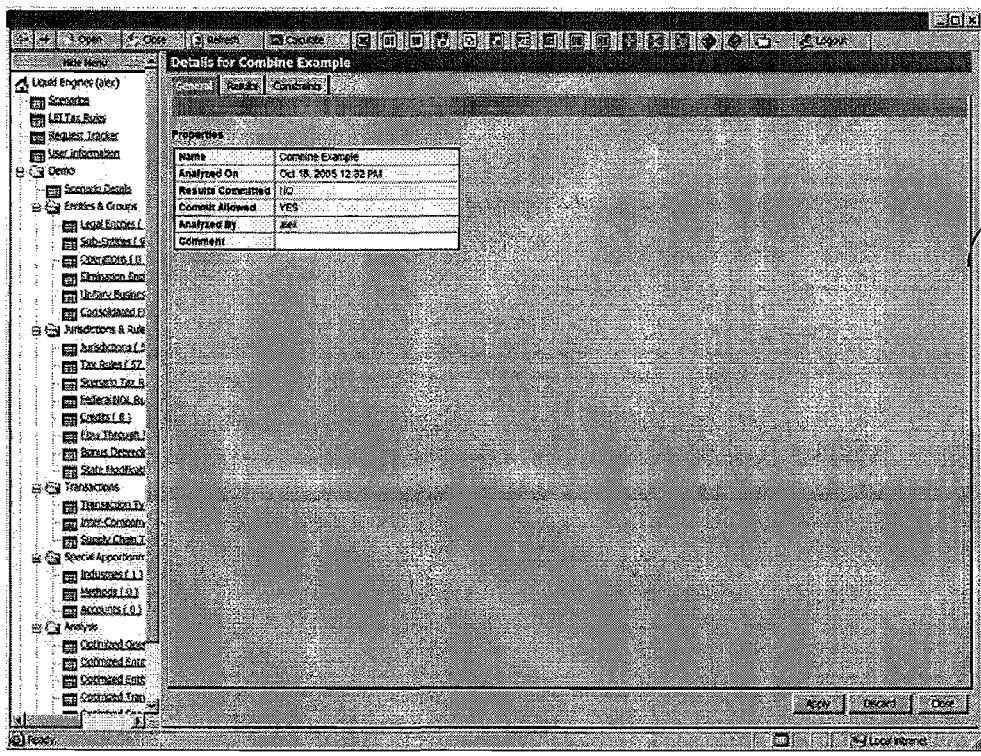
FIG. 19A is a screen shot illustrating an example embodiment of a first user interface associated with providing combine entity optimization results.
FIG. 19B is a screen shot illustrating an example embodiment of a second user interface associated with providing combine entity optimization results.
FIG. 19C is a screen shot illustrating an example embodiment of a third user interface associated with providing combine entity optimization results.
Figure 19:
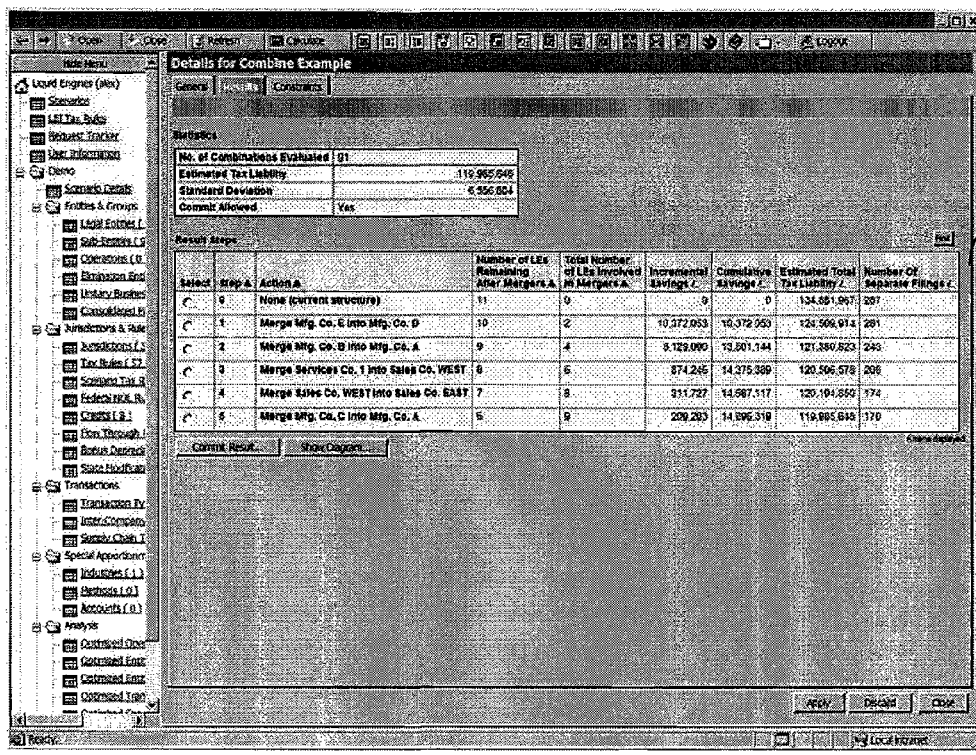
Figure 19:
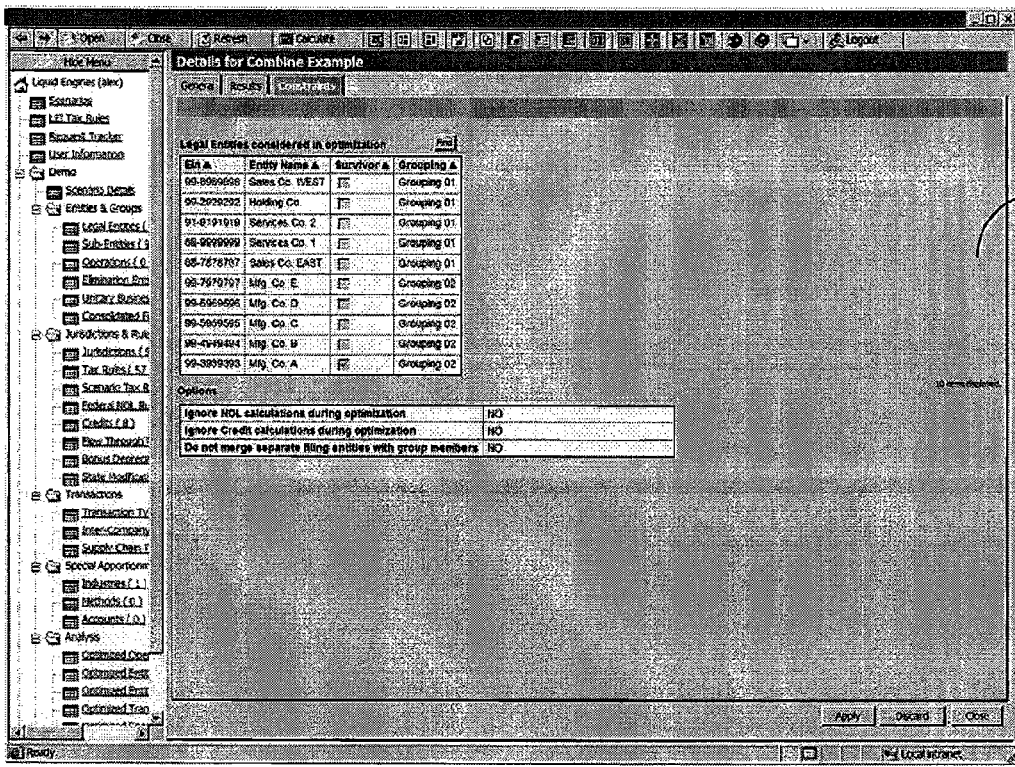

If at operation 159, however, the tax is not lower than the current tax, which, for example, may happen either because the parent entities of all original blocks contain a single block, or because no lower tax than the current tax can be found, then the process, at operation 160, continues to Process C in FIG. 15.

FIG. 15 is a flow diagram 162 illustrating an example embodiment of Process C, which is a continuation from flow diagram 150 of FIG. 14. The process starts at operation 163 by considering the first carved out block. In operation 164, the tax after putting the block considered back in the entity where it originated from (e.g., in its position according to the base entity structure) is computed; if the tax is lower than the lowest tax found so far, then the identity of the block is stored and the lowest tax found updated accordingly. If, at operation 165, it is determined the current block is not the last block carved out, the next block is considered at operation 166, and the process continues with that block at operation 164. Once all blocks have been analyzed, operation 167 checks whether the lowest tax found lies below the current tax. For example, if moving any block back to its original location results in additional savings. If it does not, then it continues to operation 169, described below. If at operation 165 additional saving may be achieved, the block yielding the largest additional savings, at operation 168, may be moved back to its original position and the current tax may then be set to the lowest tax found. Then the corresponding operation may be removed from the solution to be returned to the user, and the process loops back to operation 163, starting with the first of the remaining carved out blocks.

At operation 169, the first newly created entity is considered. At operation 170, the tax achieved by putting all the blocks in the newly created entity considered back into their originating entities (e.g., in their position according to the base entity structure, thereby cancelling the creation of the new entity) is computed; if the tax is lower than the lowest tax found so far, then the identity of the entity is stored and the lowest tax found updated accordingly. If, at operation 171, it is determined the current entity is not the last of the newly created entities, the next such entity is considered at operation 172, and the process continues with that entity at operation 170. Once all entities have been analyzed, operation 173 checks whether the lowest tax found lies below the current tax, for example, if cancelling the creation of any new entity results in additional savings. If it does, then the cancellation yielding the largest savings is performed at operation 174, for example, all the blocks the entity contains may be moved back to their original position and the current tax may then be set to the lowest tax found. Then the corresponding operations may be removed from the solution to be returned to the user, and the process loops back to operation 169, starting with the first of the remaining newly created entities. If it is found at operation 173 that no additional savings may be achieved, then the process continues to operation 175 by exiting and returning the results to the user.

In an example embodiment, the results returned may include, but not be limited to a vector containing the following 8 elements: 1) taxAmounts [operation], the tax for each operation returned (double[ ]); 2) entityStructures [operation] [entity]: for each operation, the assignment of the blocks to entities (int[ ][ ]); 3) transferPrices [operation] [transactionType]: for each operation, the set of transfer prices that minimizes tax (double[ ][ ]); 4) report: A hash table with summary statistics (keys may be String, values may be Double); 5) splitBlock [operation]: for each operation, which block gets split (int[ ]); 6) intoEntity [operation]: for each operation, into which entity the block may be put (int[ ]); 7) newEntity [operation]: for each operation, whether that operation leads to the creation of a new entity (boolean[ ]); and 8) numberOfFilings [operation]: for each operation, the number of separate filings.

The total number of combinations to be checked may depend on the number of new entities created. A (wide) upper bound may be given by $3N^2/2$, where N is the number of blocks selected for split (there may be at most $N^2/2$ split trials to perform, at most the same number of possibilities of moving blocks back to their original position, and at most the same number of possibilities of cancelling the creation of new entities).

FIGS. 16A to 20 illustrate example embodiments of user interfaces that may be utilized by a user to perform the methods and operations discussed herein. In one embodiment, the user interface module 24 may be used to provide the user interface that allows for a user to enter some or all of base structure entity data, legal entity data, select specific MSTA operations to run, and to display results (e.g., views and/or reports) associated with the results obtained from any of the modules described above with reference to FIG. 2. In various embodiments, the user interface module 24 may provide the interface to client device 16 from the MSTA 12 via network 14 or may provide the interface locally on client device 16. In other embodiments, the user interface module 24 functionality may be incorporated into the entity restructuring modules (e.g., entity restructuring module 26, entity combine module 28, etc.)

FIG. 16A is a screen shot 180 illustrating an example embodiment of a user interface associated with a split optimizer run receiving input data into controls that may include text boxes, check boxes and buttons to allow the user to run optimization on a sub-set of scenario years. Generally, the optimization may run across all years in the scenario.

FIG. 16B is a screen shot 181 illustrating an example embodiment of a user interface associated with a split optimizer run receiving input data into controls that may include check boxes to allow the user to select legal entities to be split. For each selectable legal entity, identification, a name, and a total state tax liability may be specified.

FIG. 16C is a screen shot 182 illustrating an example embodiment of a user interface associated with a split optimizer run receiving input data into controls that may include check boxes; and drop down boxes to allow the user to select sub-entities that may be split from their parent entities and specify the constrains to be used in the optimization. The user may require the optimizer not to recombine a sub-entity that was split with any other sub-entity by checking the "Standalone Only" checkbox. The user may also build groups of sub-entities using the "Recombine Grouping" option. The optimizer then may only be allowed to recombine split sub-entities with other split sub-entities that have the same grouping option.

FIG. 16D is a screen shot 183 illustrating an example embodiment of a user interface associated with a split optimizer run receiving input data into controls that may include a finish button to allow user to begin the actual optimization calculations.

FIG. 17A is a screen shot 184 illustrating an example embodiment of a user interface associated with providing split entity optimizer run results including radio buttons or check boxes to allow the user to select suggested sub-entities to be included in each proposed entity. As illustrated in this figure, results may be separated out and accessed via a "tab" on the user interface. For example, the general tab may produce a table of properties such as analysis name, date, etc., to verify execution or other properties of the MSTA run. Also, buttons are provided for the user to apply the selections, discard them, or just close the window.

FIG. 17B is a screen shot 185 illustrating an example embodiment of a user interface associated with providing split entity optimizer run results including statistics on number of combinations evaluated, estimated tax, etc. It may also include radio buttons or check boxes to allow the user to select suggested sub-entities to be included in each proposed entity and buttons to allow the user to apply the selections, discard them, or just close the window.

FIG. 17C is a screen shot 186 illustrating an example embodiment of a user interface associated with providing split entity optimizer run results including listing sub-entities considered in the process and options regarding ignoring NOL calculation or credit calculation during the process. It may also include check boxes to allow the user to select suggested sub-entities to be included in each proposed entity and buttons to allow the user to apply the selections, discard them, or close the window.

In one embodiment, the results of the split entity optimizer run may be displayed to the user in a "workflow" approach: starting from the existing entity structure, the optimizer reports the individual operations that must be performed in order to achieve savings (e.g., which sub-entities must be split and in which newly created sub-entities they must be included; see example in FIG. 17B showing a single sub-entity being split, but multiple operations may be typical in other applications). In order to allow users to make informed decisions on which operations to perform, the entity split module 32 may report, for each operation, the following results: 1) the total number of sub-entities split if all operations up to and including the current operation are performed; 2) the total number of new legal entities created if all operations up to and including the current operation are performed; 3) the incremental savings achieved by performing the current operation only; 4) the cumulative savings achieved by performing all operations up to and including the current operation; 5) the estimated total tax liability if all operations up to and including the current operation are performed; and 6) the total number of separate entity filings if all operations up to and including the current operation are performed.

Displaying the results in this way ensures that the user may decide which of the recommended operations to perform by trading off the achievable tax savings and filing costs against the cost of performing the required restructuring.

FIG. 18A is a screen shot 187 illustrating an example embodiment of a user interface associated with a combine optimizer run receiving input data into controls that may include text boxes, check boxes and buttons to allow the user to run optimization on a sub-set of scenario years. Generally, the restructuring process may run across all years in the scenario.

FIG. 18B is a screen shot 188 illustrating an example embodiment of a user interface associated with a combine optimizer run receiving input data into controls that may include check boxes and drop down boxes to allow the user to select legal entities that maybe combined either from the list of parent entities, or from the members of a specific group.

FIG. 18C is a screen shot 189 illustrating an example embodiment of a user interface associated with a combine optimizer run receiving input data into controls that may include a finish button to allow the user to begin the actual optimization calculations. The input data may be utilized by the entity combine module 28, and more specifically the entity combine optimizer as described above, to generate results for display on the user interface. Although not shown, in other embodiments, these controls may be in any form known in the art, such as radio buttons, etc.

FIG. 19A is a screen shot 190 illustrating an example embodiment of a user interface associated with providing combine-entity process results including check boxes to allow the user to select suggested entities to be included in each proposed merger. Additionally, buttons are provided for the user to apply the selections, discard them, or close the window.

FIG. 19B is a screen shot 191 illustrating an example embodiment of a user interface associated with providing combine optimizer results including statistics on number of combinations evaluated, estimated tax, etc. It may also include check boxes or radio buttons to allow the user to select suggested mergers to be performed; and buttons to allow the user to apply the selections, discard them, or close the window.

FIG. 19C is a screen shot 192 illustrating an example embodiment of a user interface associated with providing combine entity process results including listing legal entities considered in the process and options regarding ignoring NOL calculation, ignoring credit calculation, and not merging separate filing entities with group members. In one embodiment, the results of the combine entity process run may be displayed to the user in a "workflow" approach: starting from the existing entity structure, the optimizer reports the individual pair-wise mergers that must be performed in order to achieve savings in a stepwise fashion. In order to allow users to make informed decisions on which operations to perform, the entity combine module 28 also reports, for each operation, the following results: 1) the number of entities remaining after all mergers up to and including the operation considered are performed; 2) the total number of entities involved in such mergers; 3) the incremental savings achieved by performing the current operation only; 4) the cumulative savings achieved by performing all operations up to and including the current operation; 5) the estimated total tax liability if all operations up to and including the current operation are performed; and 6) the total number of separate entity state tax filings if all operations up to and including the current operation are performed.

Displaying the results in this way ensures that the user may decide which of the recommended operations he/she wants to perform by trading off the achievable tax savings and filing costs against the cost of performing the required restructuring.

Figure 20:
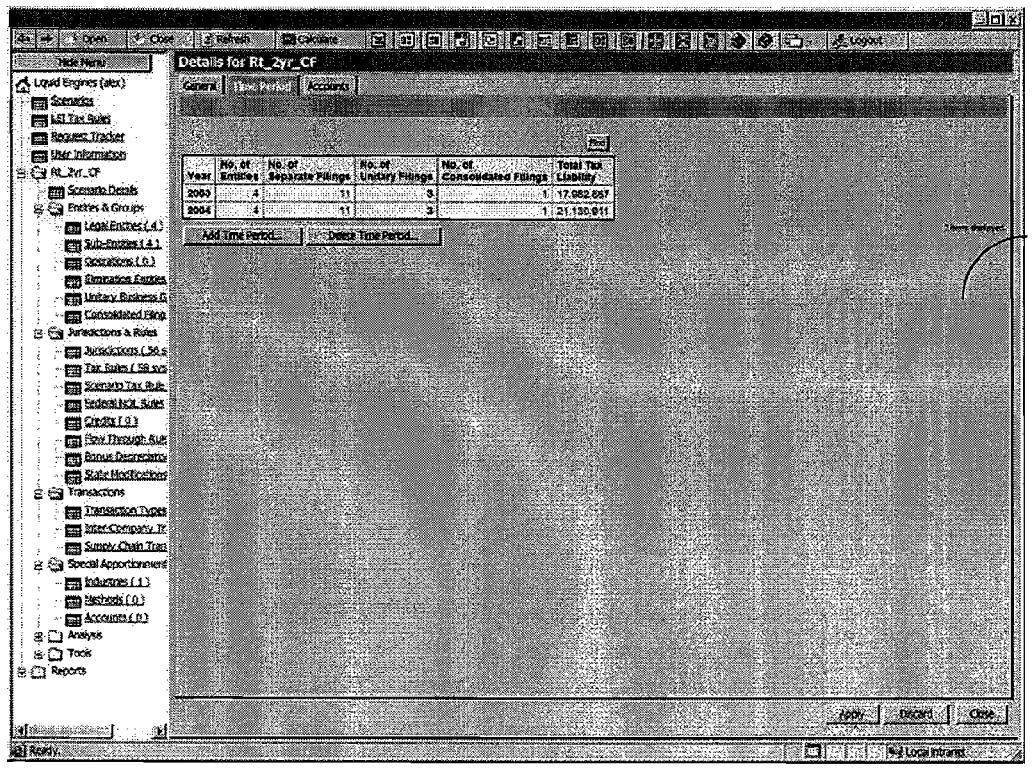
FIG. 20 is a screen shot illustrating an example embodiment of a MSTA optimization process performed over multiple years.

FIG. 20 is a screen shot 193 illustrating an example embodiment of a MSTA optimization process performed over multiple years. When the user provides multiple years of data, the MSTA may automatically compute the tax liability for each entity and group for all years for which data (which may include forecast data) is available. The effect of NOL and credit carryovers may be automatically taken into account. In one embodiment, the optimizers search for the entity structure that minimizes the sum or the present value of the total tax liability over multiple years.

Figure 21:
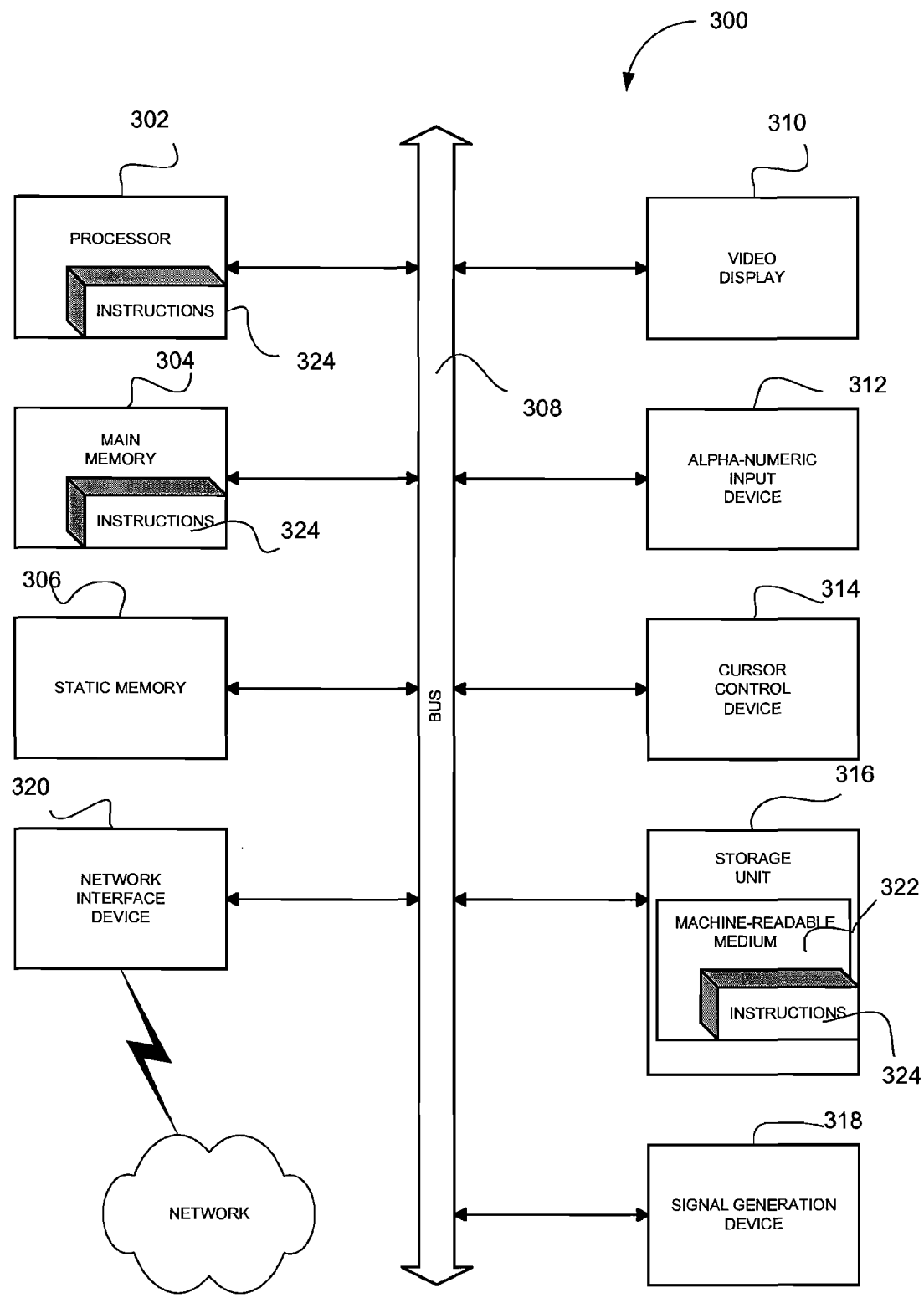
FIG. 21 is a block diagram illustrating an example embodiment of a machine for executing the methods and operations as described herein.

FIG. 21 is a block diagram 300 of an example embodiment of a machine within which a set of instructions may be executed to cause the machine to perform any one or more of the methodologies discussed herein. In alternative embodiments, the machine may operate as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine may be illustrated, the term "machine" shall also be taken to include any collection of machines that individually or jointly execute a set (or multiple sets) of instructions to perform any one or more of the methodologies discussed herein.

The example computer system 300 may include a processor 302 (e.g., a central processing unit (CPU), a graphics processing unit (GPU), or both), a main memory 304 and a static memory 306, which may communicate with each other via a bus 308. The computer system 300 may further include a video display unit 310 (e.g., a liquid crystal display (LCD) or a cathode ray tube (CRT)). The computer system 300 may also include an alphanumeric input device 312 (e.g., a keyboard), a cursor control device 314 (e.g., a mouse), a storage unit 316 (e.g., hard-disk drive), a signal generation device 318 (e.g., a speaker) and a network interface device 320.

The storage unit 316 may include a machine-readable medium 322 on which may be stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 may also constitute machine-readable media. The software 324 may further be transmitted or received over a network 326 via the network interface device 320.

While the machine-readable medium 322 may be shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that may be capable of storing, encoding or carrying a set of instructions for execution by the machine and that cause the machine to perform any one or more of the methodologies of the various embodiments of the present invention. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings is to be regarded in an illustrative rather than a restrictive sense.

The invention claimed is:

1. A tangible machine-readable medium embodying a fixed set of instructions that, when executed by the machine, cause the machine to:
load tax-relevant data into a memory accessible by the machine;
create one or more alternate entity structures in response to the tax-relevant data and a base entity structure, the base entity structure comprising one or more entities;
determine a tax liability for each alternate entity structure and the base entity structure;
and generate a result based on comparing each of the determined tax liabilities with one another.

2. The method of claim 1, further comprising receiving, prior to the creating of the one or more alternate entity structures, an input scenario, the input scenario defining attributes associated with the one or more entities.

3. The method of claim 2, wherein the creating further comprises basing the determination of the one or more alternate entity structures on rules associated with the input scenario.

4. The method of claim 2, wherein the creating further comprises basing the input scenario on an acquisition scenario for the one or more alternate entity structures.

5. The method of claim 2, wherein creating further comprises basing the input scenario on a merger scenario for the one or more alternate entity structures.

6. The method of claim 2, wherein the creating further comprises basing the input scenario on a split scenario for the one or more alternate entity structures.

7. The method of claim 1, wherein the creating of the one or more alternate entity structures includes using optimization algorithms and the generating of the result further comprises determining a selected alternate entity structure by determining which one of the one or more alternate entity structures has the lowest tax liability relative to remaining ones of the alternative entity structures and the base entity structure.

8. The method of claim 7, wherein the creating further comprises conforming to one or more constraints.

9. The method of claim 8, further comprising comparing a first lowest tax liability achieved using the one or more constraints to a second lowest tax liability achieved without using at least one of the one or more constraints.

10. The method of claim 7, further comprising creating sequential instructions to transform the base entity structure into the selected alternate entity structure.

11. The method of claim 8, further comprising receiving input selecting the one or more constraints from a list of constraints including a selection of which entities to merge together, a selection of which entities should survive, one or more options on how to group entities, an option to allow separate merging entities to merge with group members, an option to allow entities that are members of different filing groups to merge together, which sub-entities the optimizer may be allowed to move, for each selected sub-entity, which of the existing legal entities the optimizer may be allowed to place it in, selection of which sub-entities to carve out of their current entity, selection of which sub-entities to be set up as standalone entities if split from their current entity and options on how to group sub-entities that have been split into newly formed entities.

12. The method of claim 1, wherein the creating of the one or more alternate entity structures further comprises combining select entities comprised in the base entity structure, shuffling select entities comprised in the base entity structure, and splitting select entities comprised in the base entity structure.

13. The method of claim 12, further comprising selecting the select entities using one or more constraints.

14. The method of claim 1, further comprising creating the one or more alternate entity structures by combining a number of select entities comprised in the base entity structure.

15. The method of claim 1, further comprising creating the one or more alternate entity structures by shuffling a number of select entities comprised in the base entity structure.

16. The method of claim 1, further comprising creating the one or more alternate entity structures by splitting one or more select entities comprised in the base entity structure.

17. The method of claim 1, further comprising creating the one or more alternate entity structures by restructuring one or more select entities comprised in the base entity structure.

18. A system having a processor, a memory, and a display and further comprising:
an entity restructuring module executed by the processor to create one or more alternate entity structures in response to a base entity structure, the base entity structure comprising one or more entities;
an entity processing module executed by the processor to determine a tax liability for each alternate entity structure and the base entity structure; and
a results module executed by the processor to generate a result by comparing each of the determined tax liabilities with one another.

19. The system of claim 18, further comprising an input scenario, the input scenario defining attributes associated with the one or more entities.

20. The system of claim 19, wherein the entity restructuring module, prior to the creation of the one or more alternate entity structures, is to receive the input scenario and to base the determination of the one or more alternate entity structures on rules associated with the input scenario.

21. The system of claim 20, wherein the entity restructuring module is to determine the one or more alternate entity structures in response to the input scenario and one or more constraints.

22. The system of claim 20, wherein the entity processing module to create the one or more alternate entity structures is further to use one or more optimization algorithms and the results module further to determine which one of the one or more alternate entity structures has the lowest tax liability relative to remaining ones of the alternative entity structures and the base entity structure.

23. The system of claim 22, wherein the entity restructuring module is to use one or more constraints to create the one or more alternate entity structures.

24. The system of claim 23, wherein the results module is to compare a first lowest tax liability achieved using the one or more constraints to a second lowest tax liability achieved without using at least one of the one or more constraints.

25. The system of claim 22, wherein the results module is to create sequential instructions to transform the base entity structure into the determined alternate entity structure.

26. The system of claim 18, wherein the entity restructuring module to create the one or more alternate entity structures is to combine select entities comprised in the base entity structure, shuffle select entities comprised in the base entity structure, and split select entities comprised in the base entity structure.

27. The system of claim 26, wherein the entity restructuring module is to select the select entities using one or more constraints.

28. The system of claim 18, wherein the entity restructuring module is to create the one or more alternate entity structures in response to the input scenario that represents an acquisition scenario for the one or more of the alternative entity structures.

29. The system of claim 18, wherein the entity restructuring module is to create the one or more alternate entity structures in response to the input scenario that represents a merger scenario for the one or more of the alternative entity structures.

30. The system of claim 18, wherein the entity restructuring module is to create the one or more alternate entity structures in response to the input scenario that represents a split scenario for the one or more of the alternative entity structures.

31. The system of claim 18, wherein the results module is to rank each of the determined tax liabilities according to a tax liability value.

32. The system of claim 18, further comprising an entity combine module to create one or more of the alternate entity structures by combining select entities comprised in the base entity structure.

33. The system of claim 18, further comprising an entity shuffle module to create one or more of the alternate entity structures by shuffling select entities comprised in the base entity structure.

34. The system of claim 18, further comprising an entity split module to create one or more of the alternate entity structures by splitting one or more entity select entities comprised in the base entity structure.

35. A machine-readable medium embodying a fixed set of instructions that, when executed by a machine, cause the machine to:
load tax-relevant data into a memory accessible by the machine;
create one or more alternate entity structures in response to the tax-relevant data and a base entity structure, the base entity structure comprising one or more entities;
determine a tax liability for each alternate entity structure and the base entity structure; and
generate a result based on comparing each of the determined tax liabilities with one another.

36. A system, comprising:
means for loading tax-relevant data into a memory;
means for creating one or more alternate entity structures based on the tax-relevant data and a base entity structure, the base entity structure comprising one or more entities;
means for determining a tax liability for each alternate entity structure and the base entity structure; and
means for generating a result based on comparing each of the determined tax liabilities.

* * * * *

UNITED STATES PATENT AND TRADEMARK OFFICE
CERTIFICATE OF CORRECTION

PATENT NO. : 7,970,683 B2  
APPLICATION NO. : 11/551690  
DATED : June 28, 2011  
INVENTOR(S) : Edward P. Lazear and Alexandre Ziegler It is certified that error appears in the above-identified patent and that said Letters Patent is hereby corrected as shown below:

Column 18, line 2, cancel the text beginning with "1. A tangible machine-readable medium" to and ending "with one another" in column 18, line 13, and insert the following claim:

--1. A method, comprising:
  loading tax-relevant data into a memory accessible by a processor;
  creating by the processor one or more alternate entity structures based on the tax-relevant data and a base entity structure, the base entity structure comprising one or more entities;
  determining by the processor a tax liability for each alternate entity structure and the base entity structure; and
  generating on a display a result based on comparing each of the determined tax liabilities.--.

Column 20, line 37, insert --tangible-- prior to "machine-readable medium" so that the beginning of the claim reads "35. A tangible machine-readable medium".

Signed and Sealed this  
Fifteenth Day of November, 2011

David J. Kappos  
*Director of the United States Patent and Trademark Office*